United States Patent
Ying et al.

(10) Patent No.: US 12,413,475 B2
(45) Date of Patent: Sep. 9, 2025

(54) A1 POLICY FUNCTIONS FOR OPEN RADIO ACCESS NETWORK (O-RAN) SYSTEMS

(71) Applicant: Intel Corporation, Santa Clara, CA (US)

(72) Inventors: Dawei Ying, Hillsboro, OR (US); Leifeng Ruan, Beijing (CN); Jaemin Han, Portland, OR (US); Qian Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/550,276

(22) PCT Filed: Jul. 5, 2022

(86) PCT No.: PCT/US2022/036130
§ 371 (c)(1),
(2) Date: Sep. 12, 2023

(87) PCT Pub. No.: WO2023/283192
PCT Pub. Date: Jan. 12, 2023

(65) Prior Publication Data
US 2024/0214272 A1    Jun. 27, 2024

Related U.S. Application Data

(60) Provisional application No. 63/218,861, filed on Jul. 6, 2021.

(51) Int. Cl.
*H04L 41/0894* (2022.01)
(52) U.S. Cl.
CPC .............................. *H04L 41/0894* (2022.05)
(58) Field of Classification Search
CPC .................................................. H04L 41/0894
See application file for complete search history.

(56) References Cited

U.S. PATENT DOCUMENTS

2020/0329381 A1   10/2020  Chou et al.
2021/0184989 A1    6/2021  Wu et al.
(Continued)

FOREIGN PATENT DOCUMENTS

WO     2021/048831 A1    3/2021

OTHER PUBLICATIONS

O-RAN, "O-RAN Architecture Description," O-RAN.WG1.O-RAN-Architecture-Description-v04.00, 2021 by O-RAN Alliance e.V., Alfter, Germany, 33 pages.
(Continued)

*Primary Examiner* — Glenton B Burgess
*Assistant Examiner* — Jihad K Boustany
(74) *Attorney, Agent, or Firm* — Schwabe, Williamson & Wyatt, P.C.

(57) ABSTRACT

The present invention relates to an apparatus comprising: memory to store policy statement information for a plurality of radio access network (RAN) automation applications (rApps); and processing circuitry, coupled with the memory, to: retrieve the policy statement information from the memory, wherein the policy statement information includes respective policy scope identifiers for respective rApps in the plurality of rApps; identify a conflict associated with common or overlapping policy scope identifiers between two or more rApps from the plurality of rApps; modify one or more A1 policies associated with an A1 interface connecting a non-real-time (non-RT) RAN intelligence controller (RIC) and a near-real-time (near-RT) RIC to resolve the conflict; and notify the two or more rApps of the modification of the one or more A1 policies.

20 Claims, 30 Drawing Sheets

(56) References Cited

U.S. PATENT DOCUMENTS

2021/0241090 A1* 8/2021 Chen .................. H04W 24/02
2022/0295309 A1* 9/2022 Akhtar ................ H04W 24/02

OTHER PUBLICATIONS

O-RAN, "O-RAN Working Group 3 Near-Real-time RAN Intelligent Controller Near-RT RIC Architecture," O-RAN.WG3.RICARCH-v02.00, 2021 by O-RAN Alliance e.V., Alfter, Germany, 59 pages.
O-RAN, "O-RAN Working Group 2 Non-RT RIC Architecture," O-RAN.WG2.Non-RT-RIC-ARCH-TS-v01.00, 2021 by O-RAN Alliance e.V., Alfter, Germany, 17 pages.
O-RAN, "O-RAN Working Group 2 Non-RT RIC: Functional Architecture," O-RAN.WG2.Non-RT-RIC-ARCH-TR-v01.01, 2021 by O-RAN Alliance e.V., Alfter, Germany, 51 pages.
O-RAN, "O-RAN Working Group 2 (Non-RT RIC and A1 interface WG) A1 interface: General Aspects and Principles," O-RAN.WG2.A1GAP-v02.02, 2021 by O-RAN Alliance e.V., Alfter, Germany, 21 pages.
International Patent Office—International Search Report and Written Opinion mailed Oct. 26, 2022, from International Patent Application No. PCT/US2022/036130, 10 pages.
Westerberg, et al., "The innovation potential of Non Real-time RAN Intelligent Controller," Ericssion Blog, Innovation potential of Non Real-time RIC—Ericsson, website: https://www.ericsson.com/en/blog/2020/10/innovation-potential-of-non-real-time-ran-intelligent-controller, Oct. 21, 2020, 9 pages.
Qualcomm Incorporated, "NWDAF Decompose Architecture," SA WG2 Meeting #139E, S2-2003862, Agenda Item: 8.2, Jun. 1,-Jun. 12, 2020, Elbonia, 4 pages.

* cited by examiner

2800

Retrieving, from a memory, policy statement information for a plurality of radio access network (RAN) automation applications (rApps), wherein the policy statement information includes respective policy scope identifiers for respective rApps in the plurality of rApps
2805

Identifying a conflict associated with common or overlapping policy scope identifiers between two or more rApps from the plurality of rApps
2810

Modifying one or more A1 policies associated with an A1 interface connecting a non-real-time (non-RT) RAN intelligence controller (RIC) and a near-real-time (near-RT) RIC to resolve the conflict
2815

Notifying the two or more rApps of the modification of the one or more A1 policies
2820

Identifying a conflict associated with common or overlapping policy scope identifiers between two or more radio access network (RAN) automation applications (rApps) from a plurality of rApps based on policy statement information that includes respective policy scope identifiers for respective rApps in the plurality of rApps
2905

Modifying one or more A1 policies associated with an A1 interface connecting a non-real-time (non-RT) RAN intelligence controller (RIC) and a near-real-time (near-RT) RIC to resolve the conflict
2910

Notifying the two or more rApps of the modification of the one or more A1 policies
2915

Identifying a conflict associated with common or overlapping policy scope identifiers between two or more radio access network (RAN) automation applications (rApps) from a plurality of rApps based on policy statement information that includes respective policy scope identifiers for respective rApps in the plurality of rApps
3005

Modifying one or more A1 policies associated with an A1 interface connecting a non-real-time (non-RT) RAN intelligence controller (RIC) and a near-real-time (near-RT) RIC to resolve the conflict
3010

Notifying the two or more rApps of the modification of the one or more A1 policies
3015

Tracking a supported A1 policy type for each of a plurality of near-RT RICs, and either: notifying an rApp of a supported A1 policy type for a near-RT RIC based on a policy identifier, or notifying an rApp of a change in supported policy types for a near-RT RIC
3020

Figure 30

A1 POLICY FUNCTIONS FOR OPEN RADIO ACCESS NETWORK (O-RAN) SYSTEMS

CROSS REFERENCE TO RELATED APPLICATION

The present application is a national phase entry under 35 U.S.C. § 371 of International Application No. PCT/US2022/036130, filed Jul. 5, 2022, entitled "A1 POLICY FUNCTIONS FOR OPEN RADIO ACCESS NETWORK (O-RAN) SYSTEMS," which claims priority to U.S. Provisional Patent Application No. 63/218,861, which was filed Jul. 6, 2021, the entire disclosures of which are hereby incorporated by reference.

FIELD

Various embodiments generally may relate to the field of wireless communications. For example, some embodiments may relate to features associated with A1 policy functions for open radio access network (O-RAN) systems.

BACKGROUND

Among other things, the Open Radio Access Network (O-RAN) architecture helps enable intelligent radio access network (RAN) operation and optimization using artificial intelligence (AI) and machine learning (ML) in wireless communication networks. RAN intelligence controllers (RIC) are developed to manage AI/ML-assisted solutions for RAN functions. In the overall O-RAN architecture, A1 policies enable the Non-RT (Non-Real-Time) RIC to guide its connected Near-RT (Near-Real-Time) RICs to fulfil the RAN intent via the A1 interface.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 28, 29, and 30 depict examples of procedures for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for A1 policy functions in the Non-RT RIC framework to produce A1-P related services in the R1 interface. In some embodiments, an A1 policy function hosts the A1 policy repository, which stores A1 policies generated by an rApp, also referred to as a RAN automation application. Among other things, rApps may help optimize network traffic. Additionally, rApps can subscribe to notifications of A1 policy updates and supported A1 policy types of a specific policy scope identifier.

Some embodiments provide an A1 policy function in the Non-RT RIC. In some embodiments the A1 policy function may host an A1 policy repository and track A1 policy enforcement status. The A1 policy function may also track supported A1 policy types in connected Near-RT RICs. Among other things, embodiments of the present disclosure provide solutions for the Non-RT RIC architecture (including A1 policy functions) and related procedures, which have not been specified yet in O-RAN WG2.

A1 Policy

An A1 policy is a declarative policy, e.g., it expresses the goals of the policy, but it does not restrict any implementations on how the goals are achieved. In O-RAN, an A1 policy is used to enable Non-RT RIC/SMO to guide Near-RT RIC towards the fulfilment of the RAN intent.

An A1 policy includes a scope identifier and one or more policy statements. The scope identifier specifies the subjects of the policy statements, e.g., UEs and cells. The policy statement represents the policy goals, and it can contain policy objectives and policy resources. Policy objectives are statements with objectives to be reached in the policy. Policy resources are statements specifying usage of RAN resources.

An A1 policy may be created, modified, and deleted by the Non-RT RIC. Until a policy's deletion, it should be enforced in the Near-RT RIC. If the enforcement status changes, the Near-RT RIC would inform the Non-RT RIC.

A1 Policy Function

Figure 1:
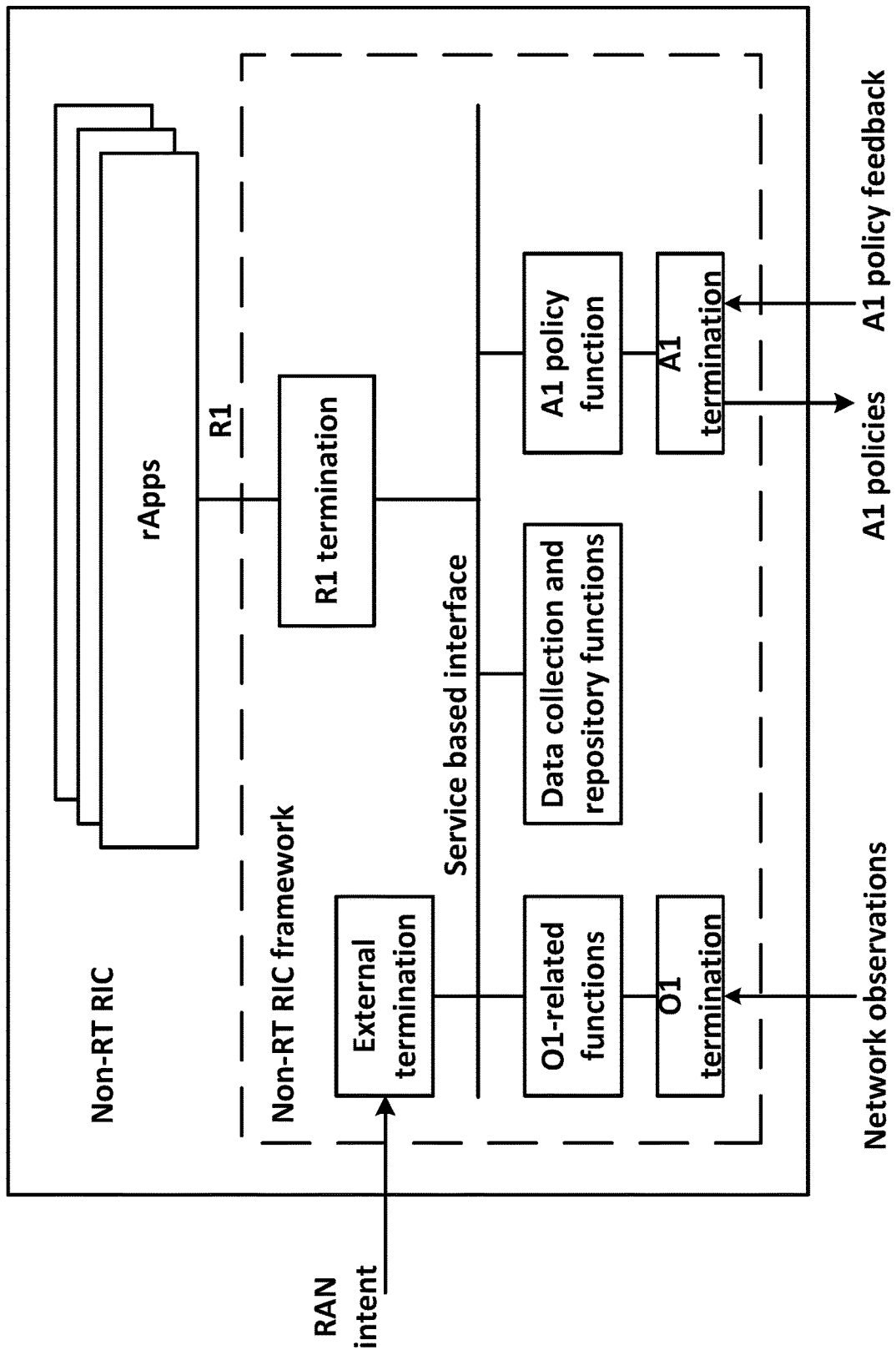
FIG. 1 illustrates an example of a non-RT RIC architecture with A1 policy function in accordance with various embodiments.

FIG. 1 illustrates an example of a non-RT RIC architecture with A1 policy function.

In one embodiment, the A1 policy function creates, updates, and deletes A1 policies in the Non-RT RIC. A1 policy function subscribes data analytics provided by rApps via interfacing with data collection and repository functions.

In another embodiment, policy generation rApps create, update, and delete A1 policies in the Non-RT RIC:

Based on the injected RAN intent, the rApp creates A1 policies.

Based on the network observation over the O1 interface, the rApp decides whether the RAN intent is fulfilled or not.

If the RAN intent is not fulfilled, the rApp modifies/updates the A1 policies.

If the RAN intent is not fulfilled, the rApp can delete the A1 policies.

The A1 policy function provides the following functionalities:

It hosts RAN intent repository.
  Policy generation rApp can subscribe/unsubscribe notifications of the creation, modification, and deletion of RAN intents.

It hosts A1 policy repository.
  Policy generation rApp store generated policy in the policy repository, and A1 policy function assign an ID to each stored policy. Note that this ID is not necessary as same as the Policy Id used in the A1 spec.
  Service consumer rApp can query A1 policies with specific policy scope identifiers (e.g., A1 policies applied to a specific UE or specific cell, etc.) or Near-RT RIC (e.g., A1 policies in a specific Near-RT RIC)
  Service consumer rApp can subscribe/unsubscribe notifications of the creation, modification, and deletion of A1 policies with specific policy scope identifiers (e.g., A1 policies applied to a specific UE or specific cell, etc.) or Near-RT RIC (e.g., A1 policies in a specific Near-RT RIC).

It performs conflict mitigation.
  If A1 policy generation rApps set contradicting policy statements to the same or overlapping policy scope identifiers, the A1 policy function resolves the conflicts by modifying one or more A1 policies. A1 policy function notifies the change of A1 policies to their generation rApp. Examples of conflicting policy statements are
    Examples for policy objective conflicts: same UE with different priority Level in QoS optimization, same slice with different qoeScore in QoE optimization, etc.
    Example for policy resource conflicts: same UE with different preference on the same cell in traffic steering policy, etc.

It tracks the enforcement status of all A1 policies created in the Non-RT RIC. Service consumer rApp can subscribe the enforcement status of A1 policies. A1 policy function notifies rApp when the enforcement status of subscribed A1 policy changes.

It tracks the supported A1 policy types of each connected Near-RT RIC.
  In one embodiment, policy generation rApp can request and subscribe/unsubscribe supported policy types given specific policy identifier. A1 policy function identify the right Near-RT RIC(s) based on the policy identifier. A1 policy function notifies supported policy types of subscribed policy identifier, based on the supported policy types of identified Near-RT RIC(s).
  In another embodiment, policy generation rApp request and subscribe/unsubscribe supported policy types of Near-RT RICs. A1 policy function notify policy generation rApp when the supported policy types of subscribed Near-RT RIC changes.

It creates, updates, and deletes A1 policies in the Near-RT RIC via A1 termination and A1 interface. It queries A1 policy status in the Near-RT RIC, and it receives A1 policy feedback from Near-RT RIC
  This functionality may also include related southbound services toward A1 termination.

A1-P Related Services in the R1 Interface

In one embodiment, Table 1 shows the A1-P related service in the R1 interface, produced by the A1-policy function.

TABLE 1

A1-P related services in the R1 interface produced by the A1-policy function

| Service Name | Service operation | Operation semantics | Description |
|---|---|---|---|
| R1_RanIntentDiscovery | RanIntentQuery | Request/response | Policy generation rApp requests RAN intent in the A1 policy function |
| | RanIntentSubscribe | Subscribe/notify | Policy generation rApp subscribes to be notified, if interested RAN intents is created, updated, and removed. |
| | RanIntentNotify | | A1 policy function notifies Policy generation rApp of its subscribed events on RAN intents |
| | RanIntentUnsubscribe | | Policy generation rApp unsubscribes its subscribed events on RAN intents |
| R1_A1PolicyManagement | A1PolicyCreate | Request/response | Policy generation rApp creates and stores a generated A1 policy in the A1 policy function, based on the RAN intent. The A1 policy function responds with an ID for created policy |
| | A1PolicyUpdate | Request/response | Policy generation rApp modifies an A1 policy stored in the A1 policy function, based on the network observation over O1 interface. |
| | A1PolicyDelete | Request/response | Policy generation rApp removes an A1 policy stored in the A1 policy function |
| | A1PolicyQuery | Request/response | rApp requests A1 policies in the A1 policy function with specific scope identifier or Near-RT RIC |
| | A1PolicySubscribe | Subscribe/notify | rApp subscribes to be notified, if |

TABLE 1-continued

A1-P related services in the R1 interface produced by the A1-policy function

| Service Name | Service operation | Operation semantics | Description |
|---|---|---|---|
| | | | A1 policies applied to specific scope identifier are created, updated, removed, and if their enforcement status changes. |
| | A1PolicyNotify | | A1 policy function notifies rApp of its subscribed events on A1 policies |
| | A1PolicyUnsubscribe | | rApp unsubscribes its subscribed events on A1 policies |
| R1_A1PolicyTypeDiscovery | A1PolicyTypeQuery | Request/response | Policy generation rApp requests supported A1 policy types with specific scope identifier or Near-RT RIC |
| | A1PolicyTypeSubscribe | Subscribe/notify | rApp subscribes to be notified, if supported A1 policy types of specific scope identifier or Near-RT RIC is changed. |
| | A1PolicyTypeNotify | | A1 policy function notifies rApp of its subscribed events on supported A1 policy types. |
| | A1PolicyTypeUnsubscribe | | rApp unsubscribes its subscribed events on supported A1 policy types. |

A1 Policy Related Procedures

RAN Intent Subscription

Figure 2:
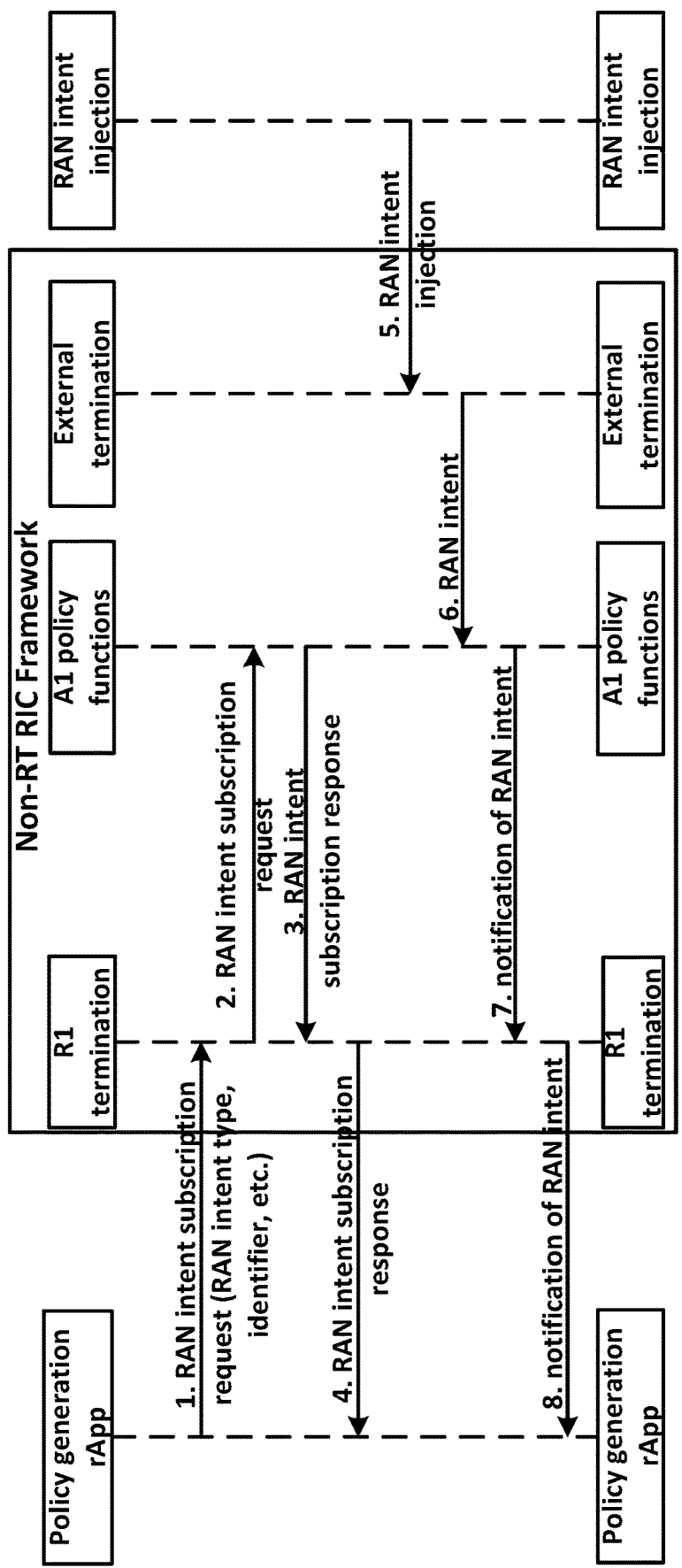
FIG. 2 illustrates an example of a procedure for RAN intent subscription in accordance with various embodiments.
Figure 3:
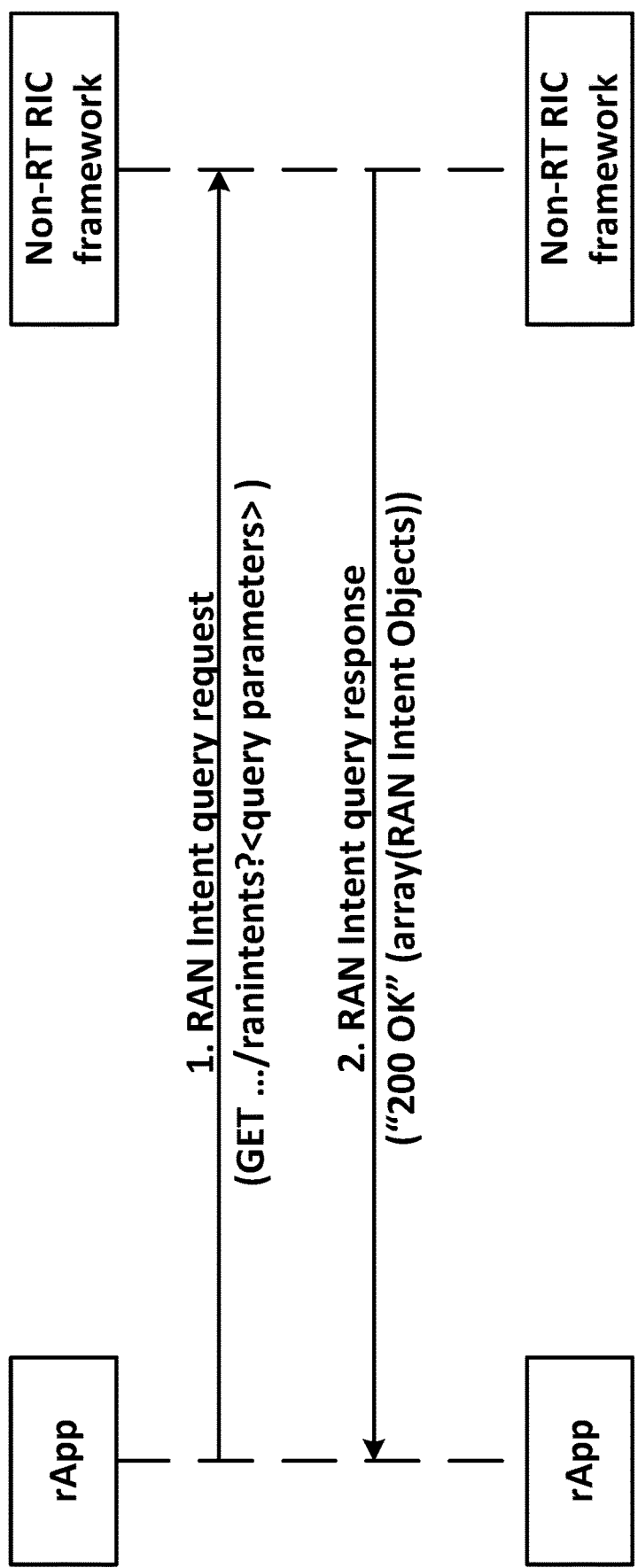
FIG. 3 illustrates an example of rApp querying RAN intent in a Non-RT RIC framework in accordance with various embodiments.
Figure 4:
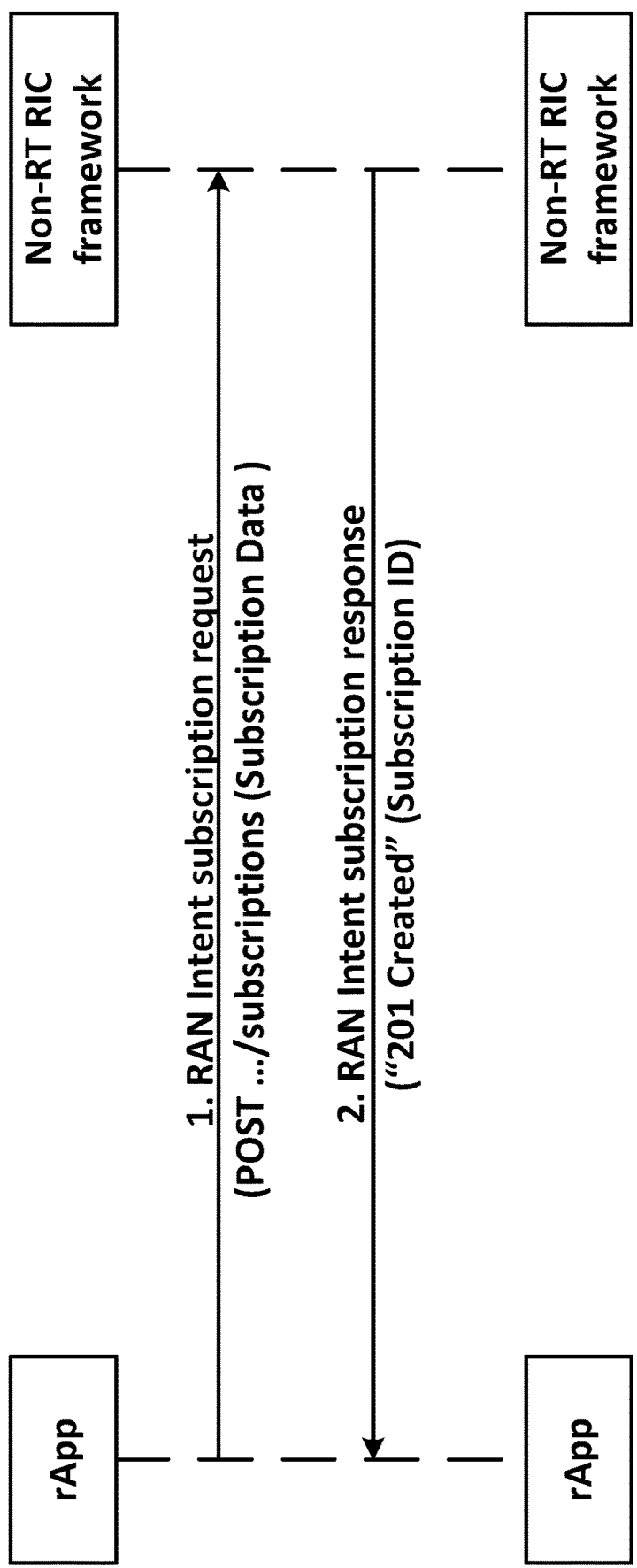
FIG. 4 illustrates an example of an rApp subscription notification of the creation, modification, and deletion of RAN intents in accordance with various embodiments.
Figure 5:
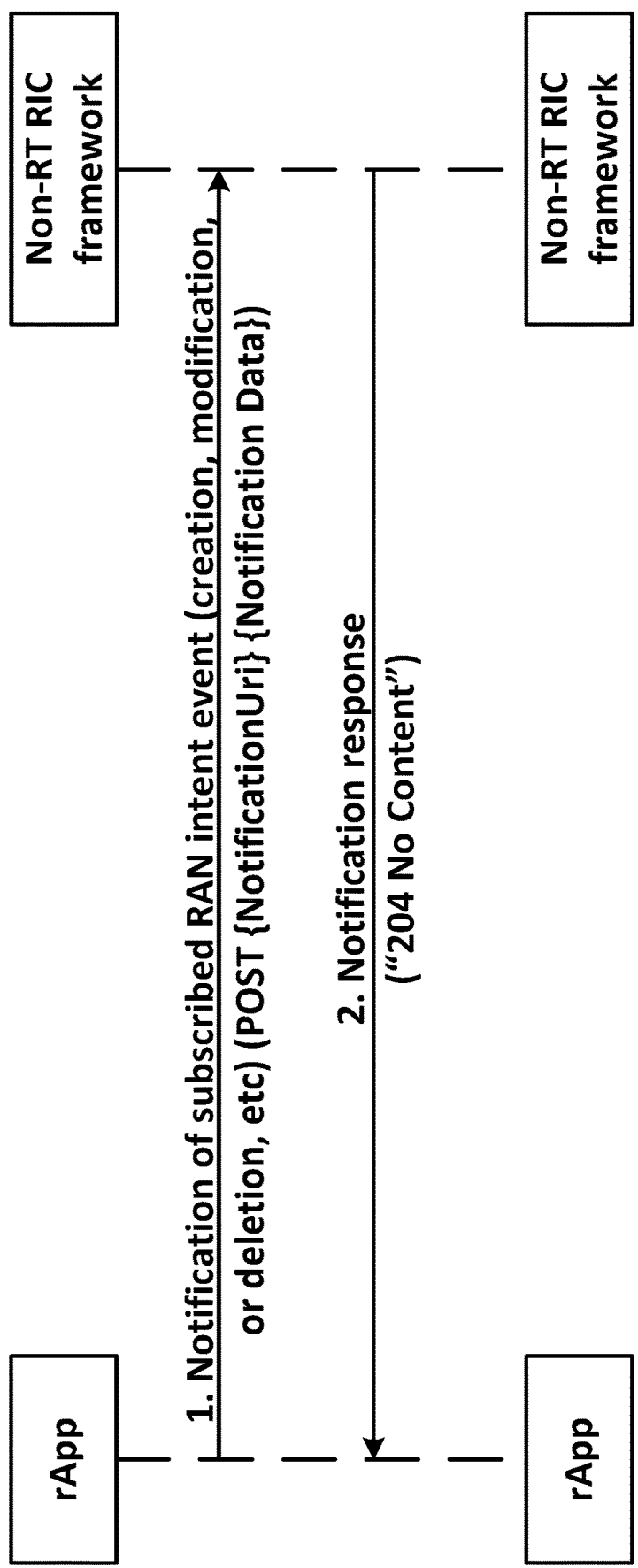
FIG. 5 illustrates an example of a Non-RT RIC notifying an rApp of a subscribed event for RAN intent in accordance with various embodiments.
Figure 6:
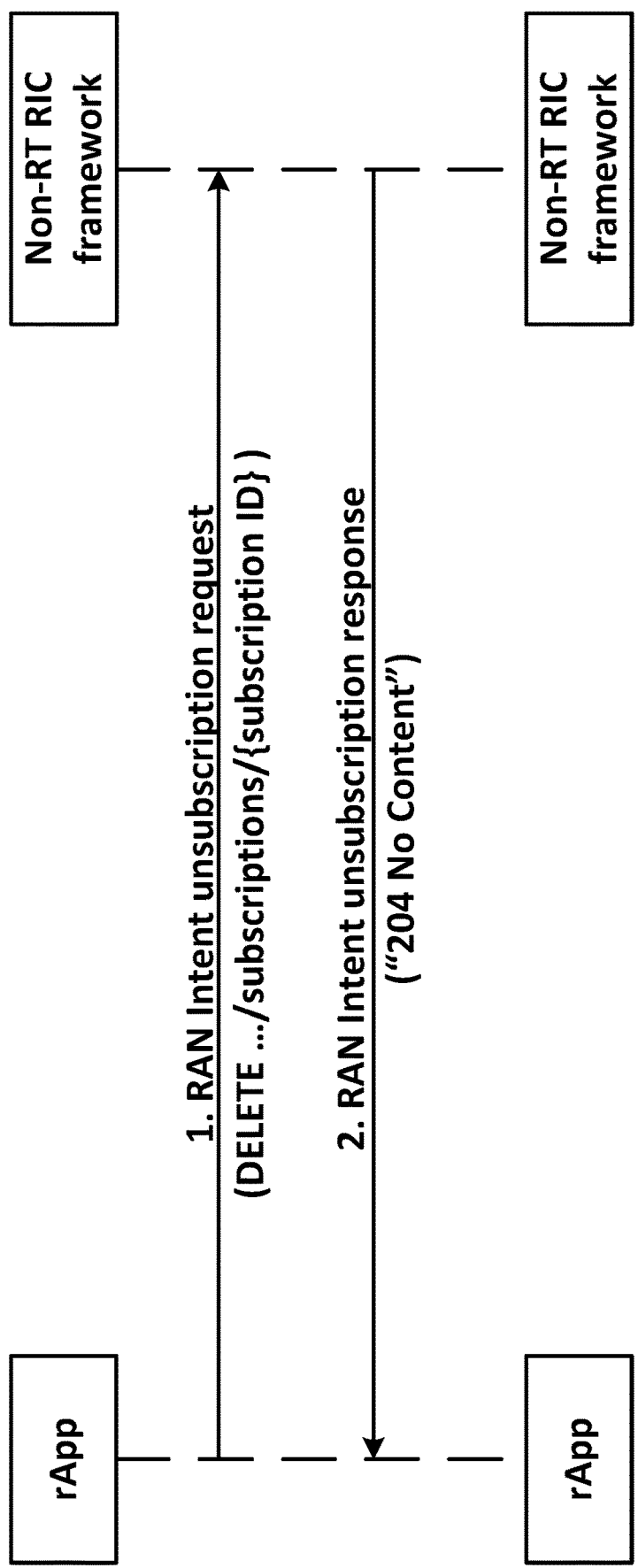
FIG. 6 illustrates an example of an rApp unsubscribing its subscribed events for RAN intent in accordance with various embodiments.

An example of a procedure for an rApp subscribing for RAN intent in A1 policy functions is illustrated in FIG. 2.

Step 1: The A1 policy generation rApp send subscription request to the Non-RT RIC framework.

Step 2: The subscription request is forwarded to the A1 policy function through R1 termination.

Step 3: A1 policy function sends back subscription response.

Step 4: Subscription response is forwarded to the policy generation rApp through R1 termination.

Step 5: RAN intent is injected into the Non-RT RIC framework.

Step 6: RAN intent is forwarded to RAN intent repository in the A1 policy function through external termination.

Step 7: A1 policy function sends notification about the newly injected RAN intent.

Step 8: The notification is forwarded to policy generation rApp through R1 termination.

For an R1 interface, examples of the service operations of a R1_RanIntentDiscovery service are illustrated in FIGS. 3 through 6.

Supported A1 Policy Type Query

Figure 7:
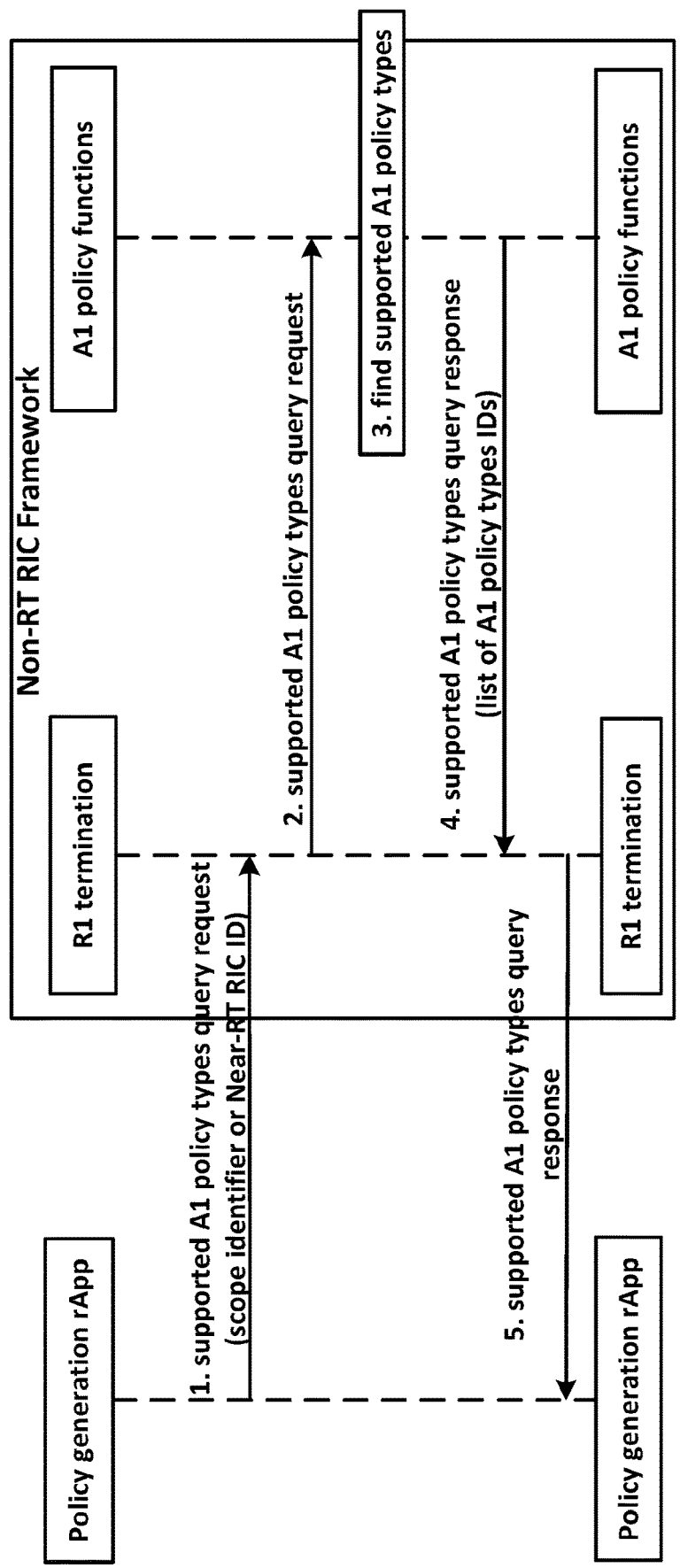
FIG. 7 illustrates an example of a procedure for an rApp querying supported A1 policy types in accordance with various embodiments.
Figure 8:
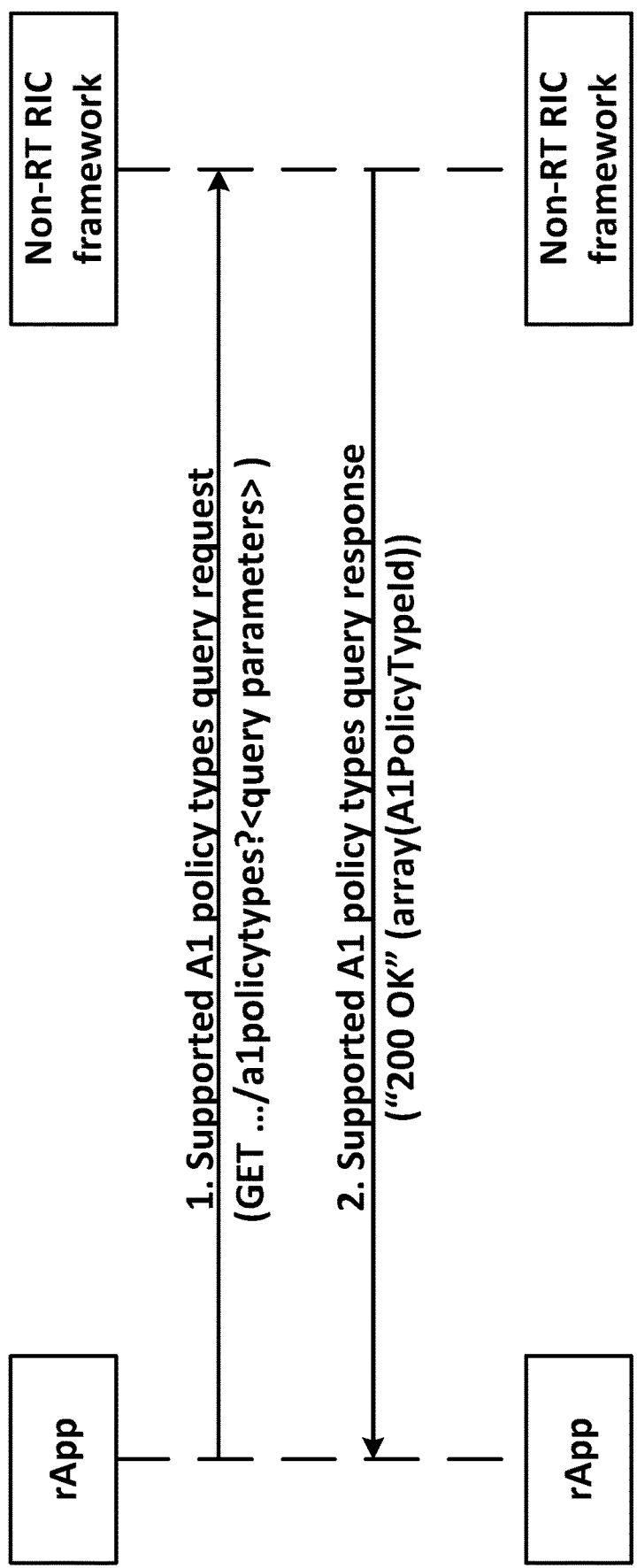
FIG. 8 illustrates an example of an rApp querying supported A1 policy types in accordance with various embodiments.
Figure 9:
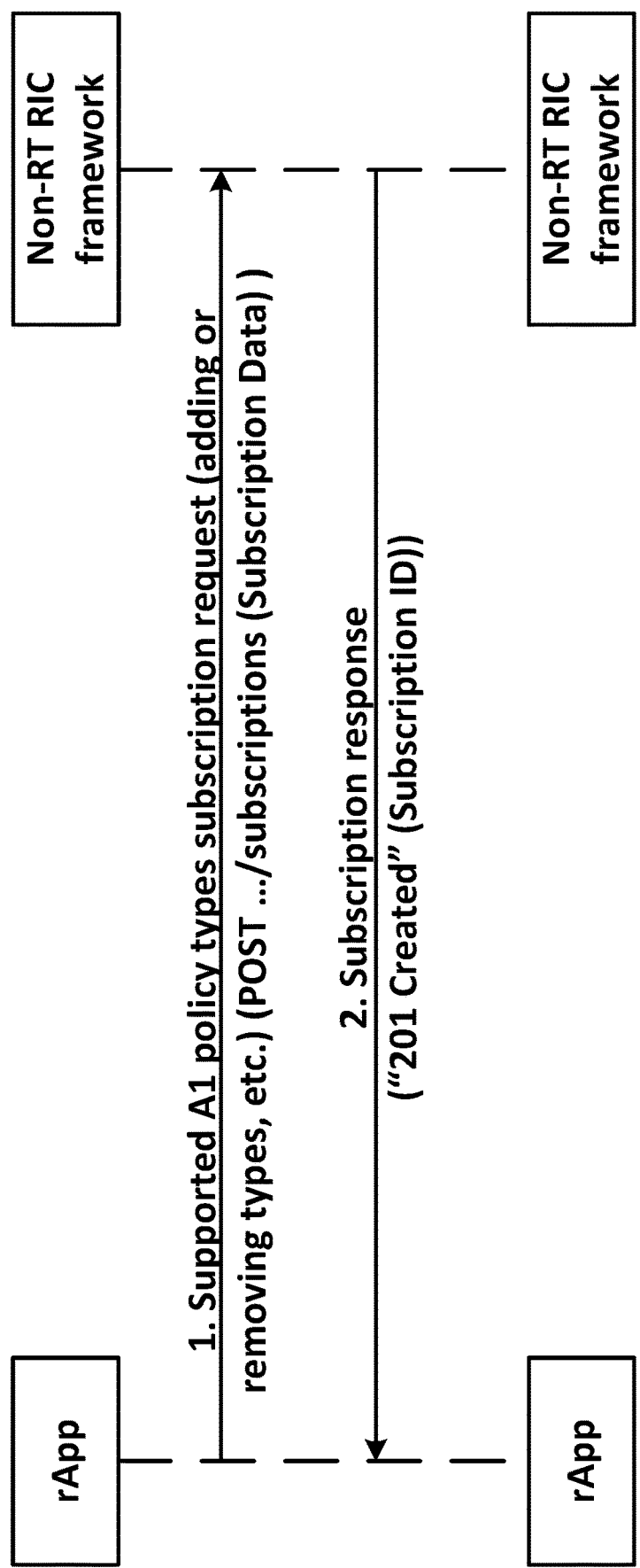
FIG. 9 illustrates an example of in accordance with various embodiments.

An example of a procedure for an rApp querying supported A1 policy types is illustrated in FIG. 7:

Step 1: rApp sends query request about supported A1 policy types to the Non-RT RIC. Policy generation rApp needs to know what types A1 policy is supported in the Near-RT RIC before generating the A1 policy.

The query can be filtered by scope identifiers (e.g., UE id, cell id, etc.) or the query can be made toward a specific Near-RT RIC.

Step 2: Query request is forwarded to A1 policy function through R1 termination

Step 3: A1 policy function figure out supported A1 policy types

Step 4: A1 policy function sends back query response with a list of supported A1 policy types.

Step 5: Query response is forwarded to rApp through R1 termination

For the R1 interface, examples of the service operations of R1_A1PolicyTypeDiscovery service are illustrated in FIGS. 8-11.

A1 Policy Creation

Figure 12:
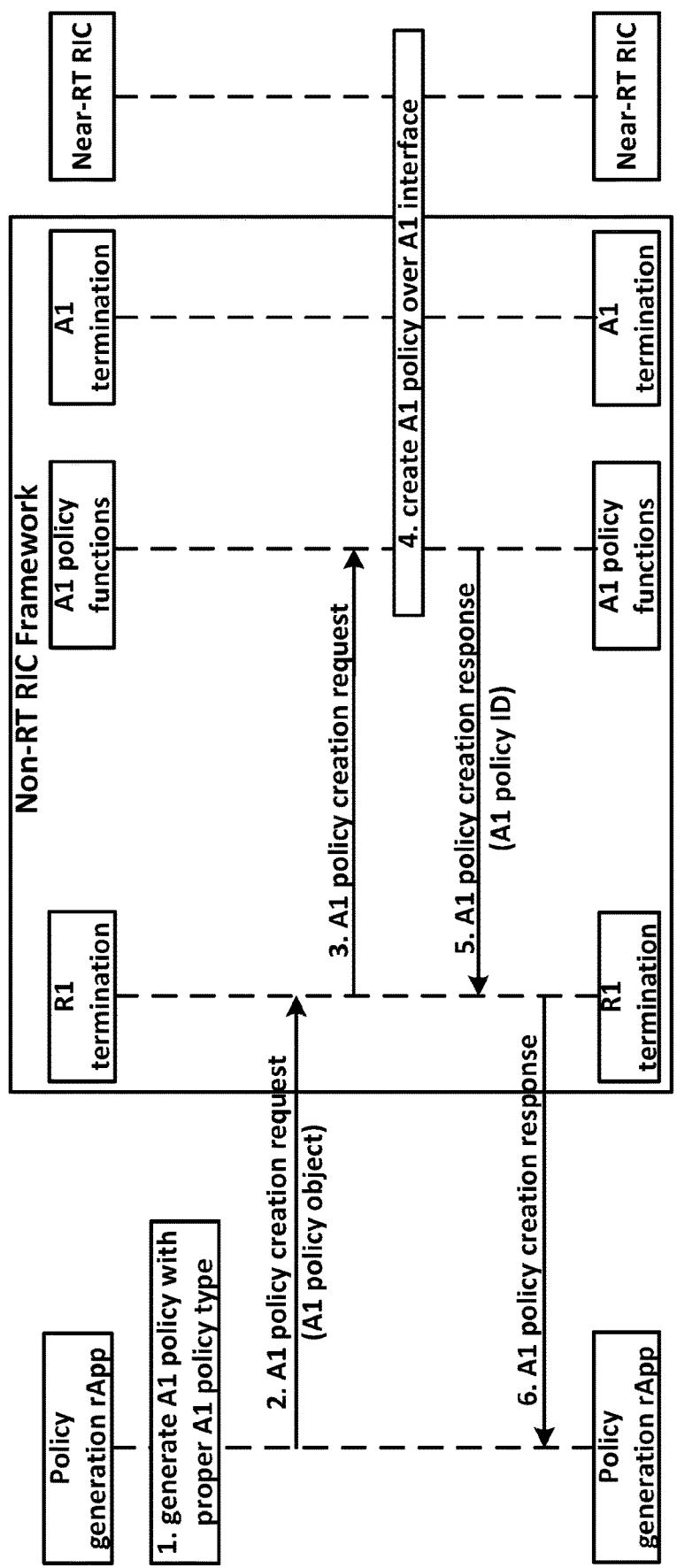
FIG. 12 illustrates an example of a procedure for an rApp to create an A1 policy in accordance with various embodiments.

An example of a procedure for creating an A1 policy is illustrated in FIG. 12:

Step 1: Policy generation rApp generates A1 policy based on the RAN intent.

Step 2: Policy generation rApp sends A1 policy creation request to Non-RT RIC framework Step 3: A1 policy creation request is forwarded to A1 policy function through R1 termination Step 4: A1 policy function creates A1 policy in the Near-RT RIC via A1 interface Step 5: A1 policy function sends back A1 policy creation response with an identification for created policy. Note that this identification is not same as A1 policy ID in A1 specification.

Step 6: A1 policy creation response is forwarded to rApp through R1 termination

A1 Policy Status Subscription

Figure 13:
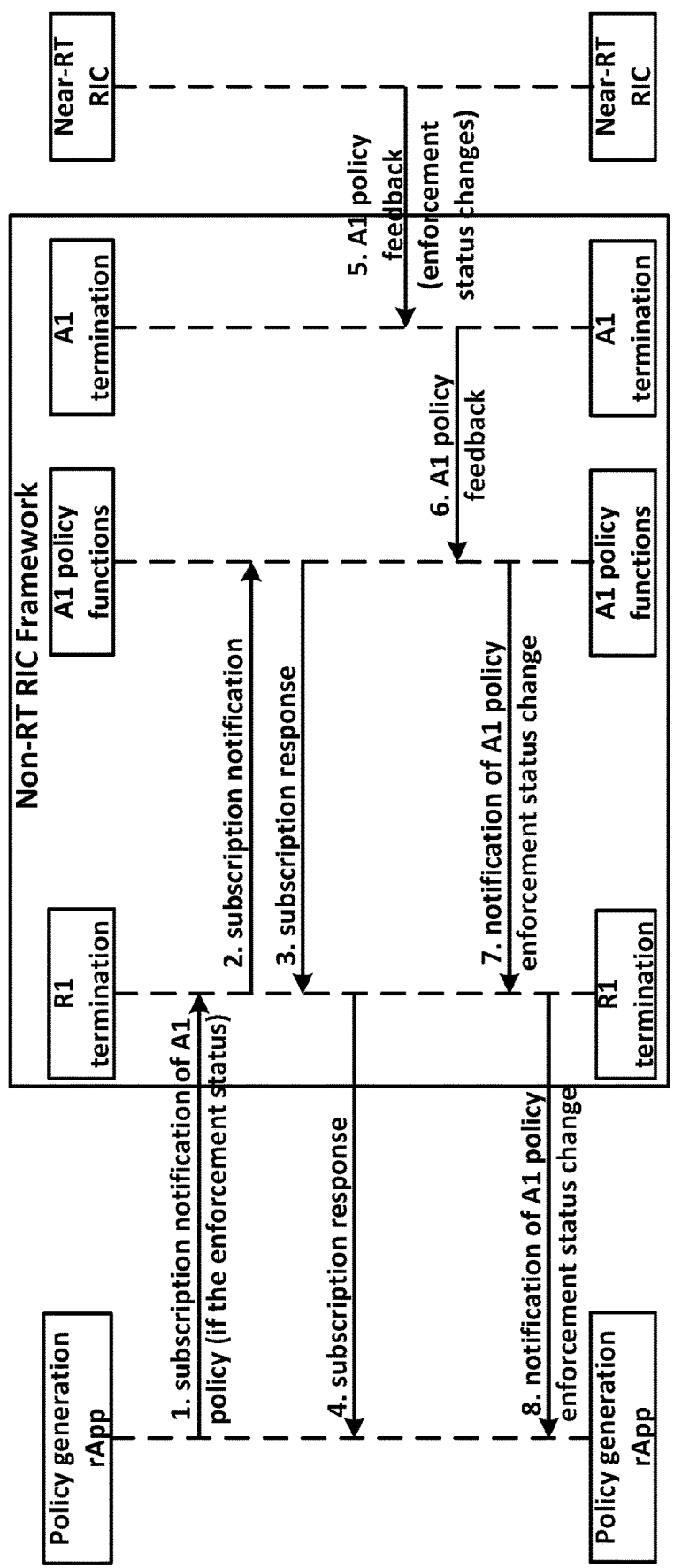
FIG. 13 illustrates an example of a procedure for an rApp to subscribe for notification of A1 policy enforcement status changes in accordance with various embodiments.

An example of a procedure for an rApp subscribing for notification of an A1 policy enforcement status change is illustrated in FIG. 13:

Step 1: Policy generation rApp subscribes notification of A1 policy, if its enforcement status changes.

Step 2: Subscription requestion is forwarded to A1 policy function through R1 termination Step 3: A1 policy function sends back subscription response.

Step 4: Subscription response is forwarded to the rApp through R1 termination.

Step 5, 6: A1 policy feedback is sent by the Near-RT RIC to indicate the change of A1 policy enforcement status to A1 policy function through A1 termination Step 7: A1 policy function notifies rApp about the change of the subscribed A1 policy enforcement status Step 8: Notification is forwarded to policy generation rApp through R1 termination.

A1 Policy Update

Figure 14:
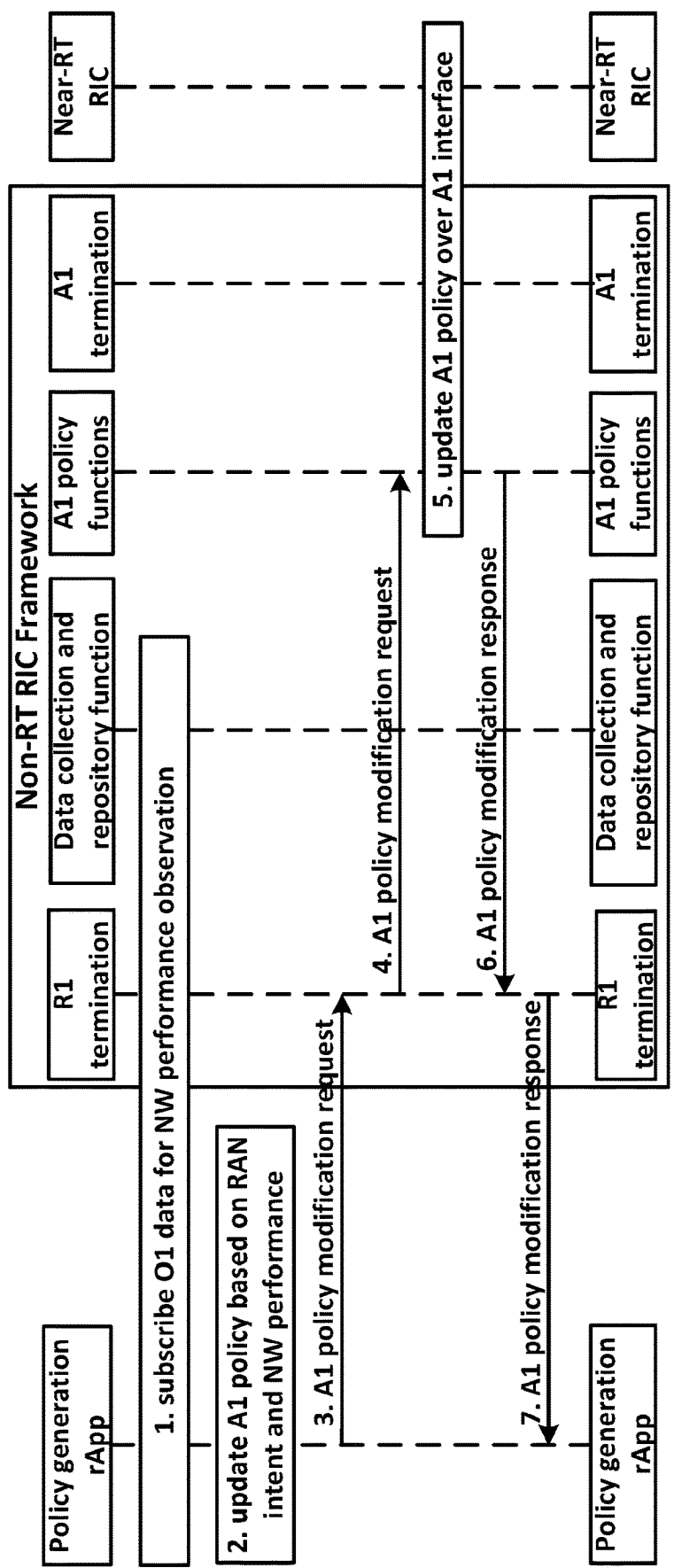
FIG. 14 illustrates an example of a procedure for an rApp to update an A1 policy in accordance with various embodiments.

An example of a procedure for an rApp updating an A1 policy is illustrated in FIG. 14:

Step 1: Policy generation rApp subscribes O1 data from data collection and repository function for network performance observation.

Step 2: Policy generation rApp updates A1 policy based on RAN intent and network performance.

Step 3: Policy generation rApp sends A1 policy modification request to the Non-RT RIC framework Step 4: Modification requestion is forwarded to A1 policy function through R1 termination Step 5: A1 policy function update A1 policy in the Near-RT RIC via A1 interface Step 6: A1 policy function sends back policy modification response.

Step 7: Policy modification response is forwarded to the rApp through R1 termination.

A1 Policy Deletion

Figure 15:
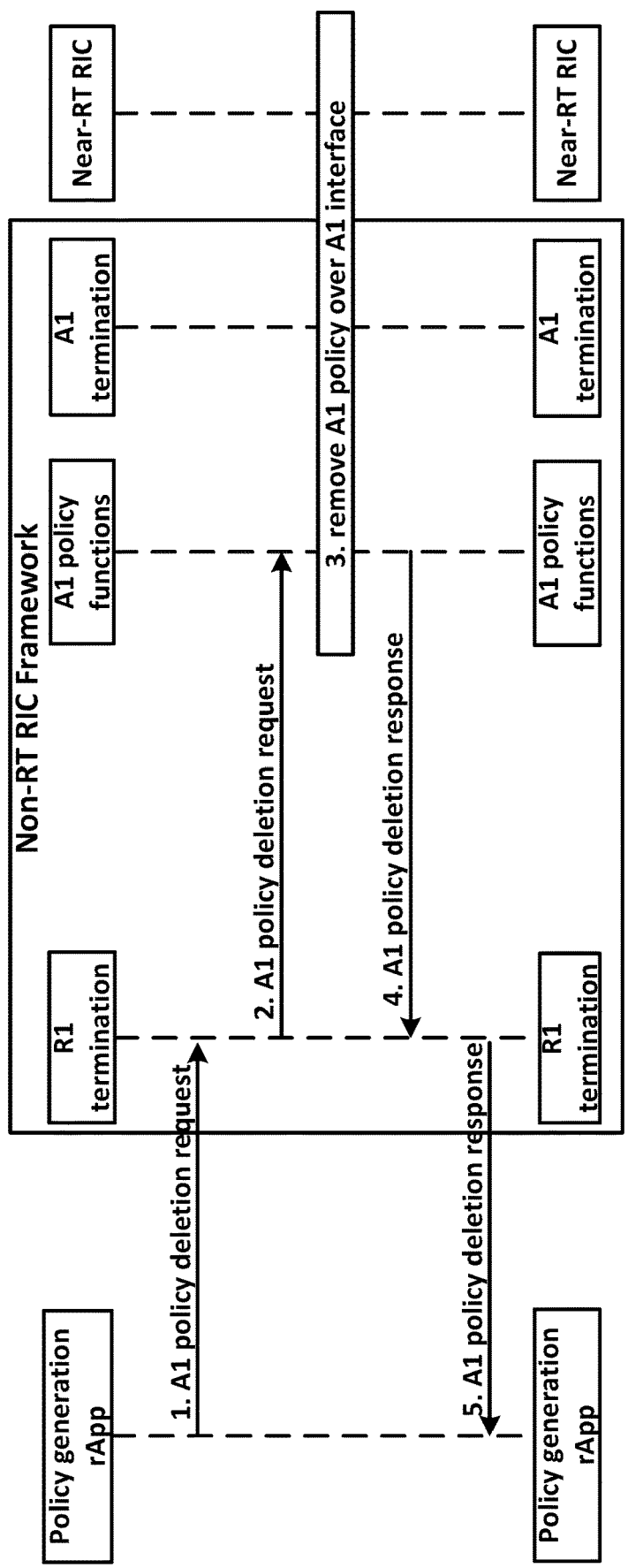
FIG. 15 illustrates an example of a procedure for an rApp to remove an A1 policy in accordance with various embodiments.
Figure 16:
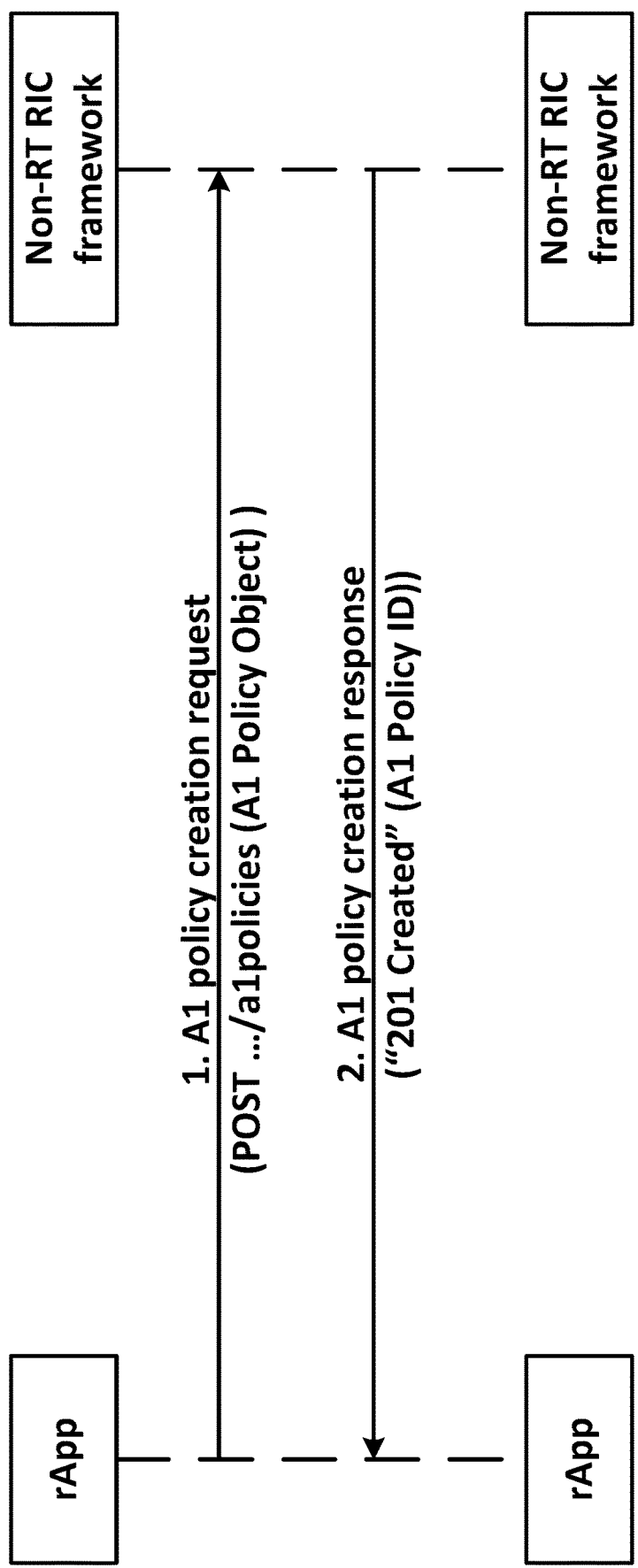
FIG. 16 illustrates an example of an rApp creating an A1 policy in accordance with various embodiments.
Figure 17:
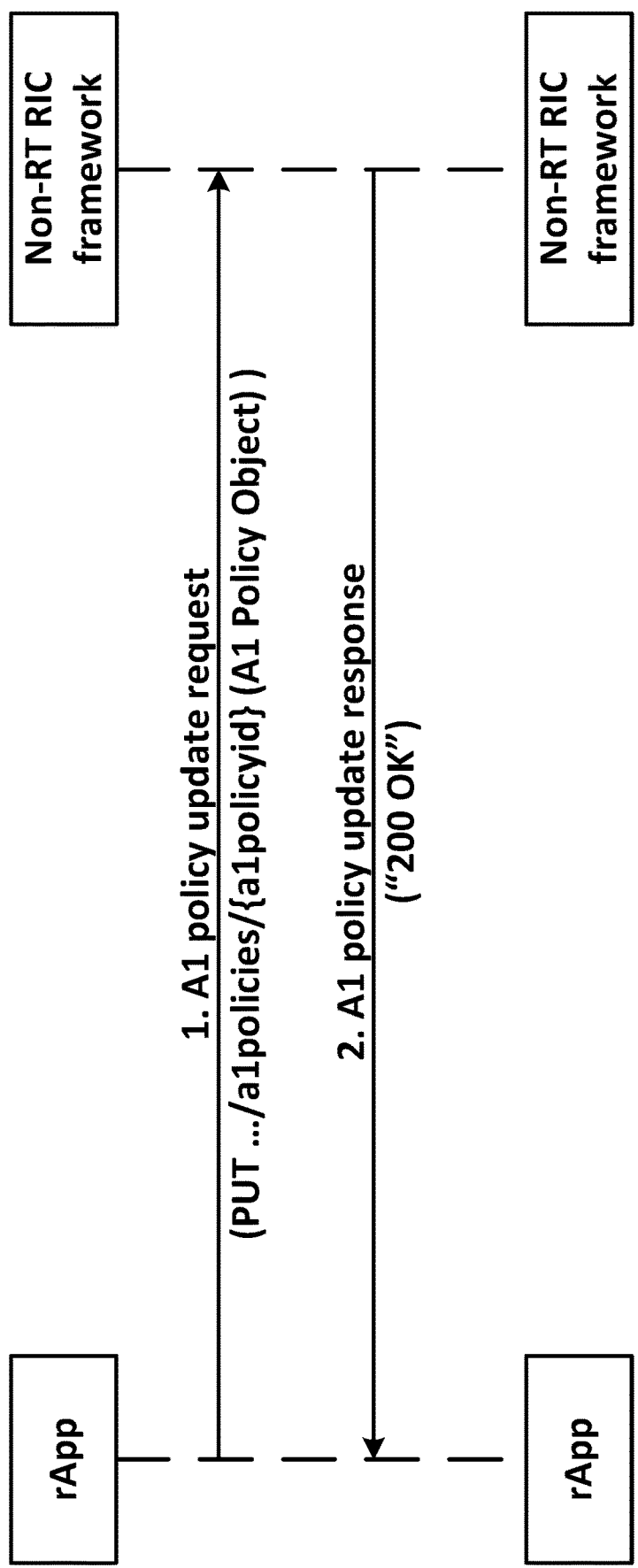
FIG. 17 illustrates an example of an rApp updating an A1 policy in accordance with various embodiments.
Figure 18:
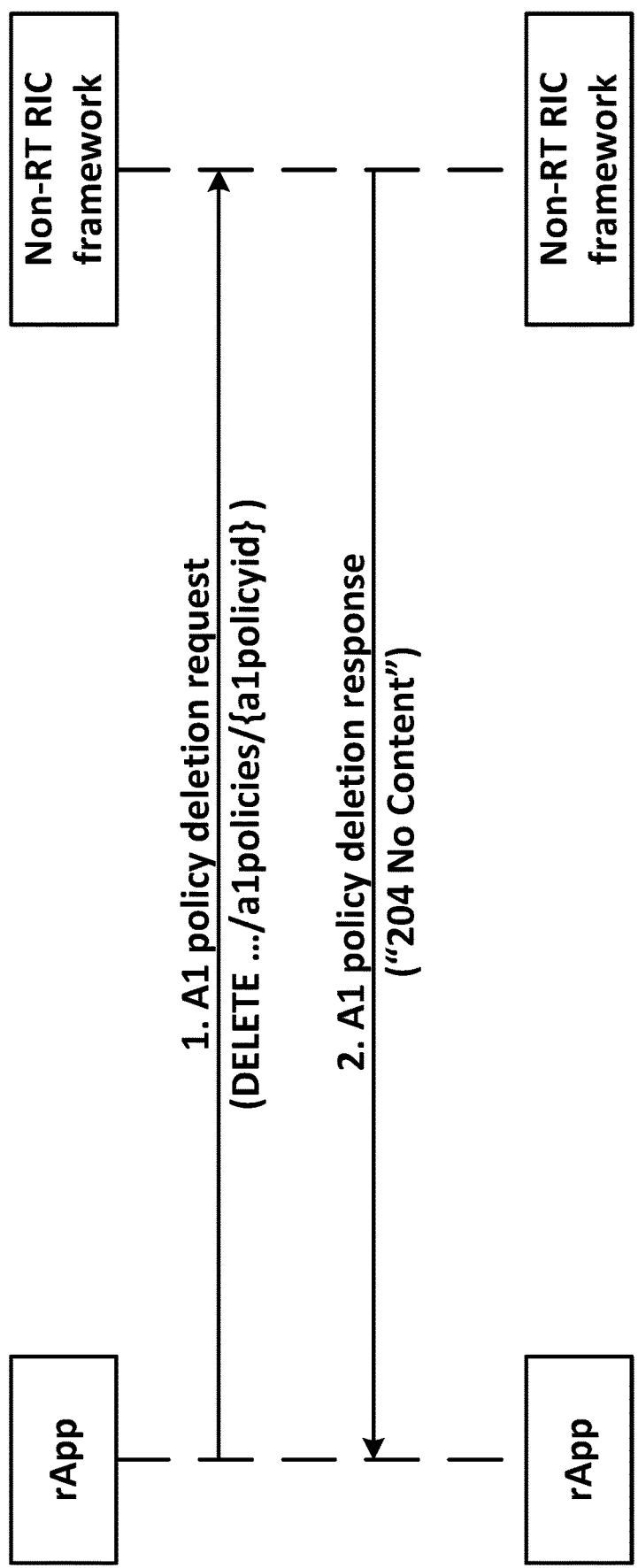
FIG. 18 illustrates an example of an rApp deleting an A1 policy in accordance with various embodiments.
Figure 19:
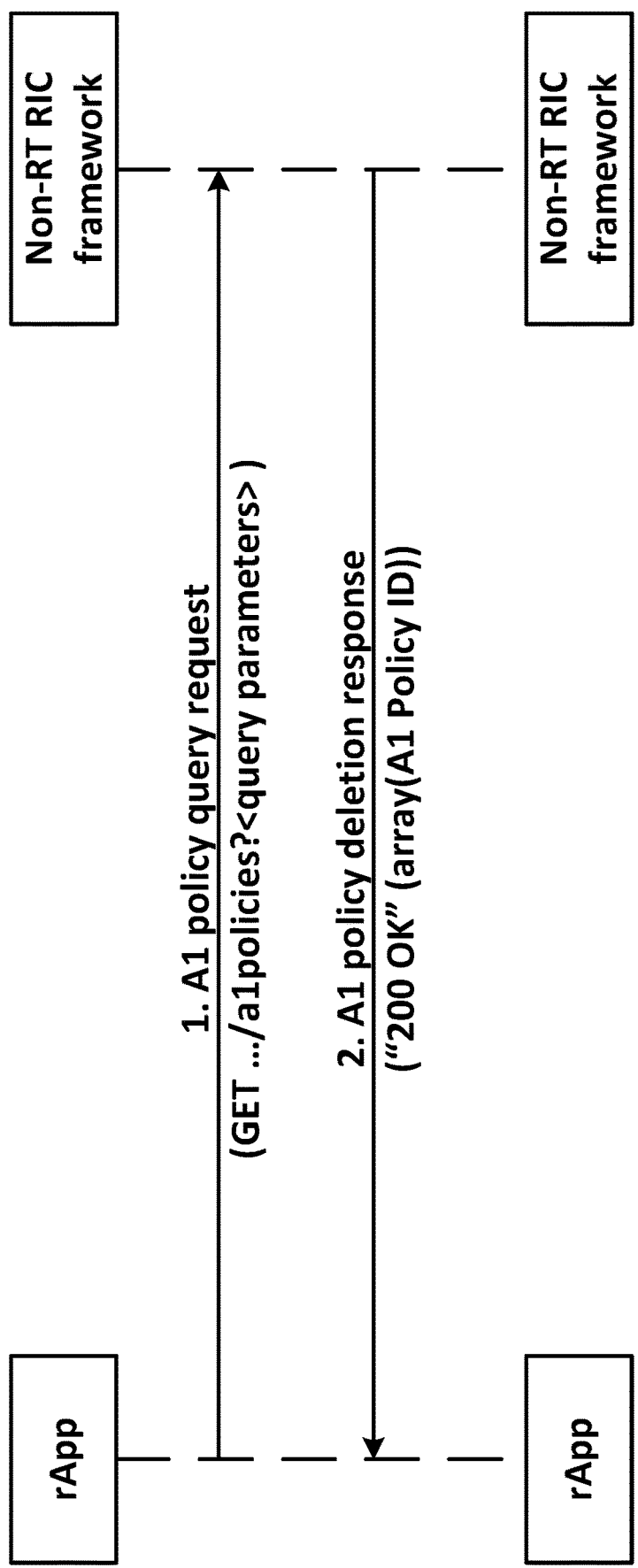
FIG. 19 illustrates an example of an rApp querying A1 policies in accordance with various embodiments.
Figure 20:
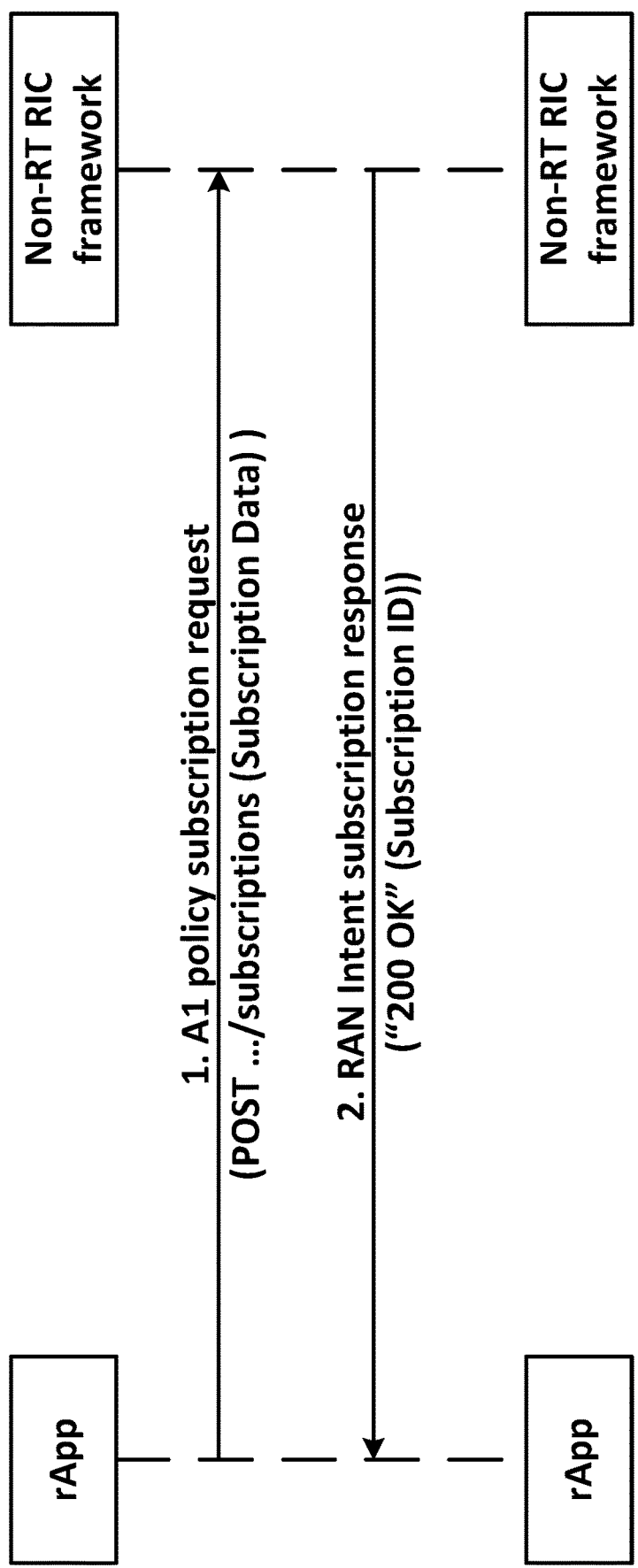
FIG. 20 illustrates an example of an rApp subscribing for notifications (e.g., new policy created, policy update or removal, policy enforcement status change) in accordance with various embodiments.
Figure 21:
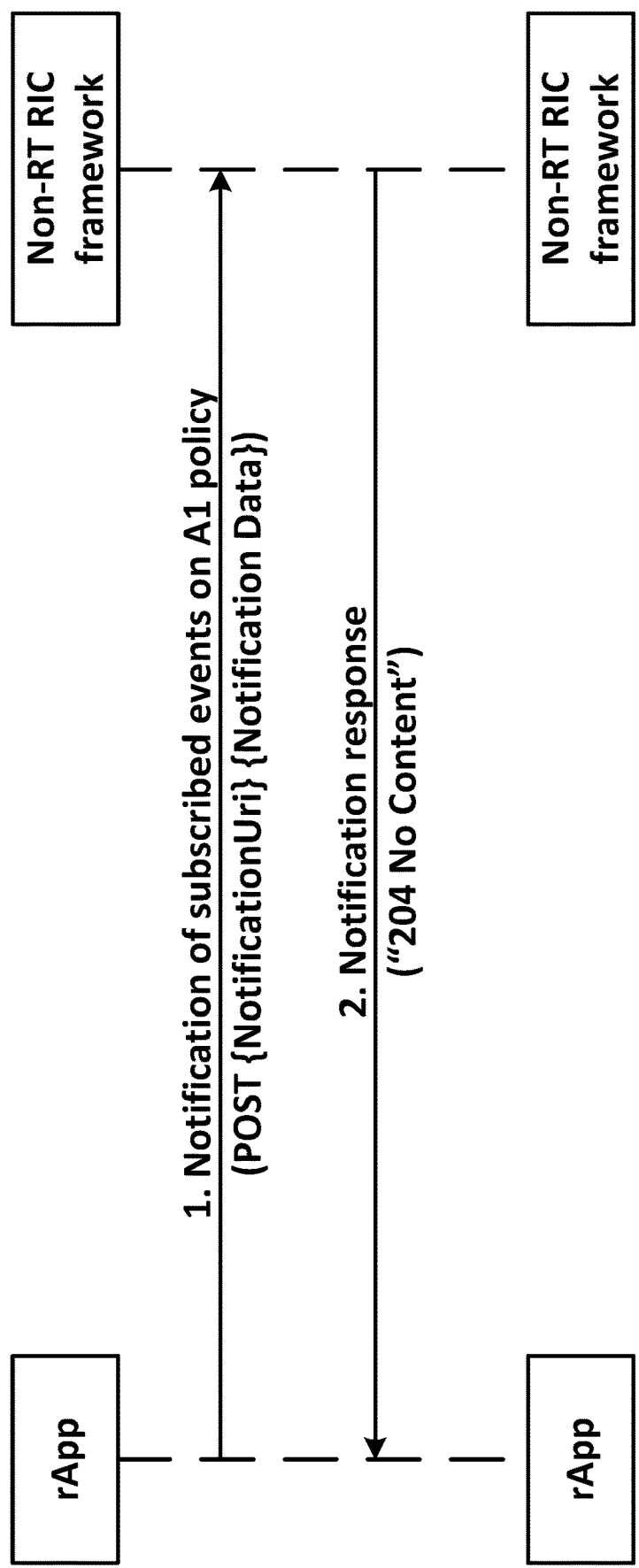
FIG. 21 illustrates an example of a Non-RT RIC framework notifying subscribed events to an rApp in accordance with various embodiments.
Figure 22:
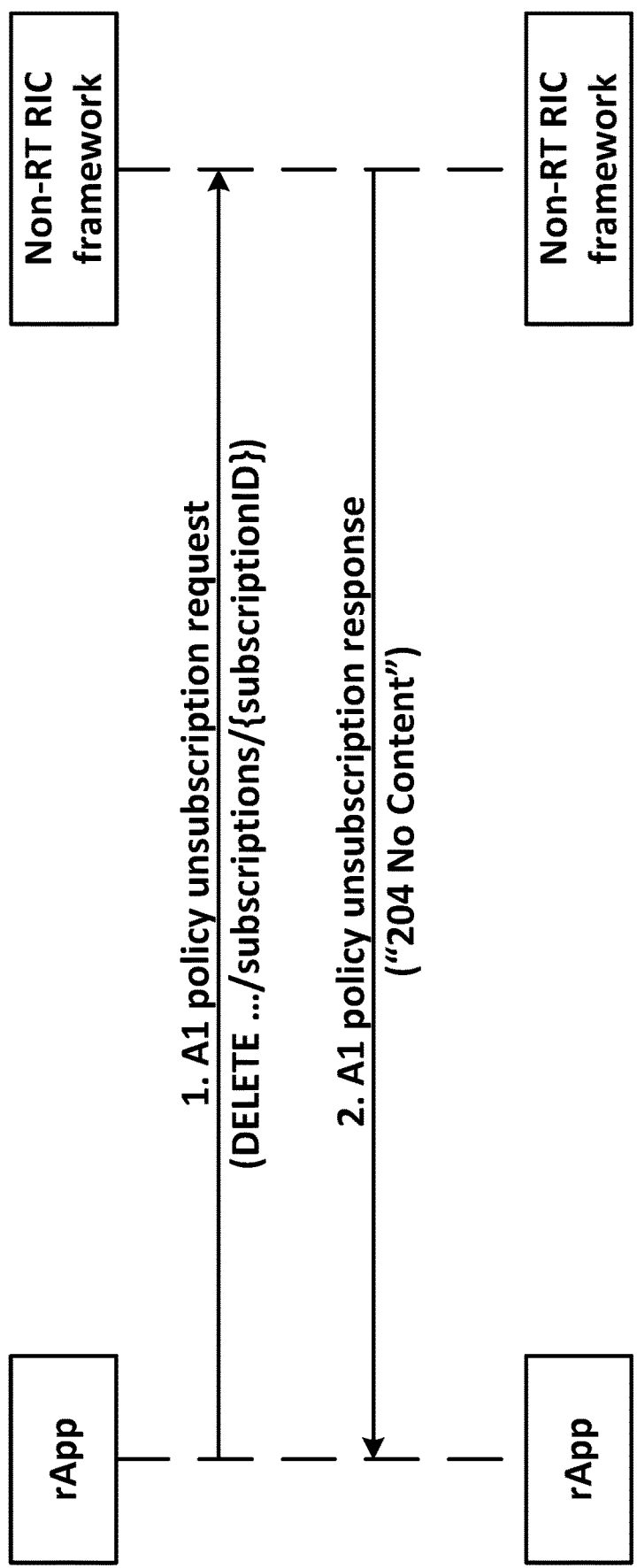
FIG. 22 illustrates an example of an rApp unsubscribing from subscribed events for A1 policies in accordance with various embodiments.

An example of a procedure for an rApp deleting an A1 policy is illustrated in FIG. 15:

Step 1: Policy generation rApp sends A1 policy deletion request to the Non-RT RIC.

Step 2: Deletion request is forwarded to A1 policy function.

Step 3: A1 policy function remove A1 policy in the Near-RT RIC via A1 interface.

Step 4: A1 policy function send back policy deletion response

Step 5: Policy deletion response is forwarded to the policy generation rApp through R1 termination.

For an R1 interface, examples of the service operations of an R1_A1PolicyManagement service are illustrated in FIGS. 16-22.

Systems and Implementations

FIGS. 23-27 illustrate various systems, devices, and components that may implement aspects of disclosed embodiments.

Figure 23:
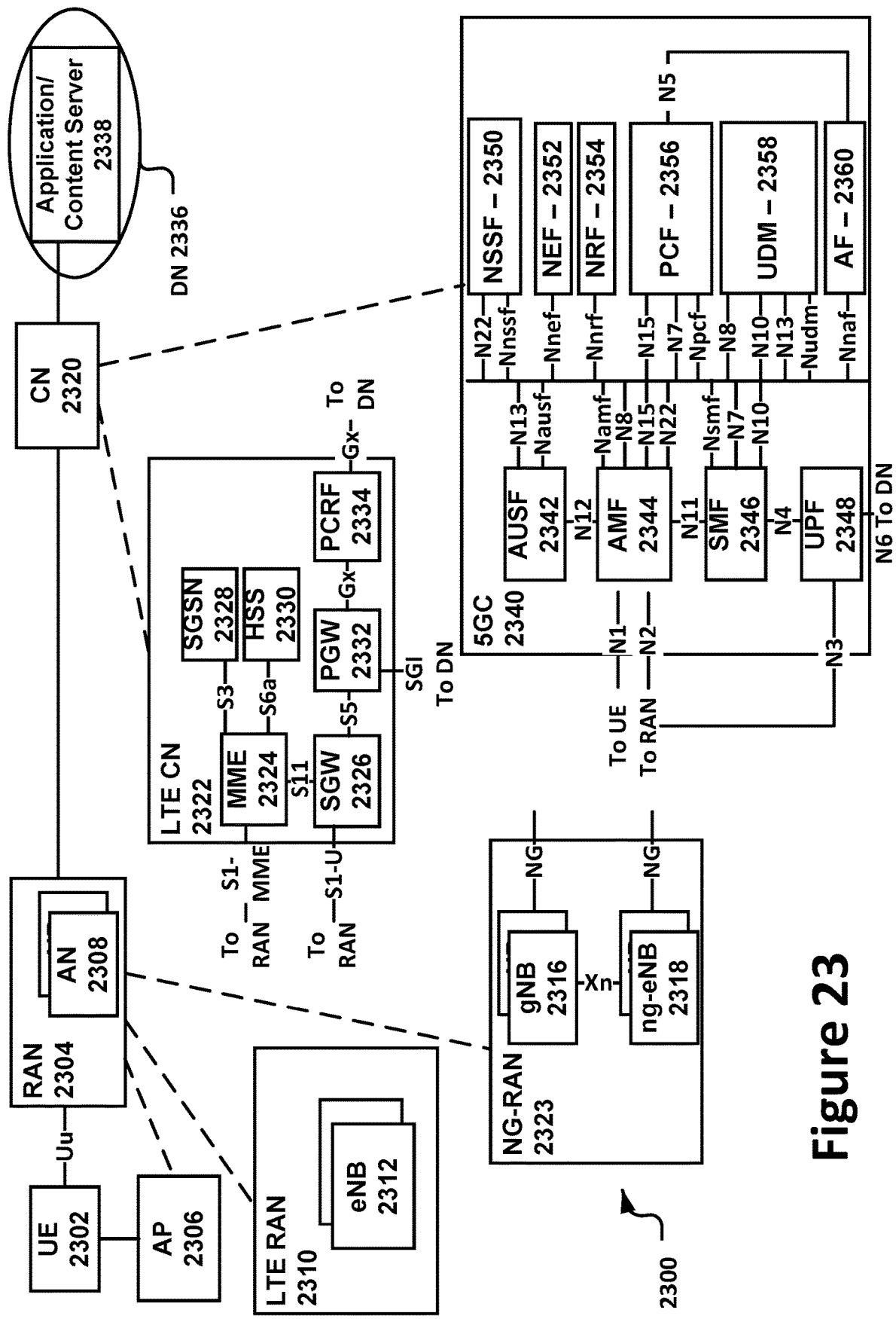
FIG. 23 schematically illustrates a wireless network in accordance with various embodiments.

FIG. 23 illustrates a network 2300 in accordance with various embodiments. The network 2300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 2300 may include a UE 2302, which may include any mobile or non-mobile computing device designed to communicate with a RAN 2304 via an over-the-air connection. The UE 2302 may be communicatively coupled with the RAN 2304 by a Uu interface. The UE 2302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 2300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 2302 may additionally communicate with an AP 2306 via an over-the-air connection. The AP 2306 may manage a WLAN connection, which may serve to offload some/all network traffic from the RAN 2304. The connection between the UE 2302 and the AP 2306 may be consistent with any IEEE 802.11 protocol, wherein the AP 2306 could be a wireless fidelity (Wi-Fi®) router. In some embodiments, the UE 2302, RAN 2304, and AP 2306 may utilize cellular-WLAN aggregation (for example, LWA/LWIP). Cellular-WLAN aggregation may involve the UE 2302 being configured by the RAN 2304 to utilize both cellular radio resources and WLAN resources.

The RAN 2304 may include one or more access nodes, for example, AN 2308. AN 2308 may terminate air-interface protocols for the UE 2302 by providing access stratum protocols including RRC, PDCP, RLC, MAC, and L1 protocols. In this manner, the AN 2308 may enable data/voice connectivity between CN 2320 and the UE 2302. In some embodiments, the AN 2308 may be implemented in a discrete device or as one or more software entities running on server computers as part of, for example, a virtual network, which may be referred to as a CRAN or virtual baseband unit pool. The AN 2308 be referred to as a BS, gNB, RAN node, eNB, ng-eNB, NodeB, RSU, TRxP, TRP, etc. The AN 2308 may be a macrocell base station or a low power base station for providing femtocells, picocells or other like cells having smaller coverage areas, smaller user capacity, or higher bandwidth compared to macrocells.

In embodiments in which the RAN 2304 includes a plurality of ANs, they may be coupled with one another via an X2 interface (if the RAN 2304 is an LTE RAN) or an Xn interface (if the RAN 2304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 2304 may each manage one or more cells, cell groups, component carriers, etc. to provide the UE 2302 with an air interface for network access. The UE 2302 may be simultaneously connected with a plurality of cells provided by the same or different ANs of the RAN 2304. For example, the UE 2302 and RAN 2304 may use carrier aggregation to allow the UE 2302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 2304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 2302 or AN 2308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU": an eNB may be referred to as an "eNB-type RSU": a gNB may be referred to as a "gNB-type RSU": and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 2304 may be an LTE RAN 2310 with eNBs, for example, eNB 2312. The LTE RAN 2310 may provide an LTE air interface with the following characteristics: SCS of 15 KHz: CP-OFDM waveform for DL and SC-FDMA waveform for UL; turbo codes for data and TBCC for control: etc. The LTE air interface may rely on CSI-RS for CSI acquisition and beam management: PDSCH/PDCCH DMRS for PDSCH/PDCCH demodulation: and CRS for cell search and initial acquisition, channel quality measurements, and channel estimation for coherent demodulation/detection at the UE. The LTE air interface may operating on sub-6 GHZ bands.

In some embodiments, the RAN 2304 may be an NG-RAN 2314 with gNBs, for example, gNB 2316, or ng-eNBs, for example, ng-eNB 2318. The gNB 2316 may connect with 5G-enabled UEs using a 5G NR interface. The gNB 2316 may connect with a 5G core through an NG interface, which may include an N2 interface or an N3 interface. The ng-eNB 2318 may also connect with the 5G core through an NG interface, but may connect with a UE via an LTE air interface. The gNB 2316 and the ng-eNB 2318 may connect with each other over an Xn interface.

In some embodiments, the NG interface may be split into two parts, an NG user plane (NG-U) interface, which carries traffic data between the nodes of the NG-RAN 2314 and a UPF 2348 (e.g., N3 interface), and an NG control plane (NG-C) interface, which is a signaling interface between the nodes of the NG-RAN 2314 and an AMF 2344 (e.g., N2 interface).

The NG-RAN 2314 may provide a 5G-NR air interface with the following characteristics: variable SCS: CP-OFDM for DL. CP-OFDM and DFT-s-OFDM for UL: polar, repetition, simplex, and Reed-Muller codes for control and LDPC for data. The 5G-NR air interface may rely on CSI-RS. PDSCH/PDCCH DMRS similar to the LTE air interface. The 5G-NR air interface 20) may not use a CRS, but may use PBCH DMRS for PBCH demodulation: PTRS for phase tracking for PDSCH: and tracking reference signal for time tracking. The 5G-NR air interface may operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 2302 can be configured with multiple BWPs where each BWP configuration has a different SCS. When a BWP change is indicated to the UE 2302, the SCS of the transmission is changed as well. Another use case example of BWP is related to power saving. In particular, multiple BWPs can be configured for the UE 2302 with different amount of frequency resources (for example, PRBs) to support data transmission under different traffic loading scenarios. A BWP containing a smaller number of PRBs can be used for data transmission with small traffic load while allowing power saving at the UE 2302 and in some cases at the gNB 2316. A BWP containing a larger number of PRBs can be used for scenarios with higher traffic load.

The RAN 2304 is communicatively coupled to CN 2320 that includes network elements to provide various functions to support data and telecommunications services to customers/subscribers (for example, users of UE 2302). The components of the CN 2320 may be implemented in one physical node or separate physical nodes. In some embodiments, NFV may be utilized to virtualize any or all of the functions provided by the network elements of the CN 2320 onto physical compute/storage resources in servers, switches, etc. A logical instantiation of the CN 2320 may be referred to as a network slice, and a logical instantiation of a portion of the CN 2320 may be referred to as a network sub-slice.

In some embodiments, the CN 2320 may be an LTE CN 2322, which may also be referred to as an EPC. The LTE CN 2322 may include MME 2324, SGW 2326, SGSN 2328, HSS 2330, PGW 2332, and PCRF 2334 coupled with one another over interfaces (or "reference points") as shown. Functions of the elements of the LTE CN 2322 may be briefly introduced as follows.

The MME 2324 may implement mobility management functions to track a current location of the UE 2302 to facilitate paging, bearer activation/deactivation, handovers, gateway selection, authentication, etc.

The SGW 2326 may terminate an SI interface toward the RAN and route data packets between the RAN and the LTE CN 2322. The SGW 2326 may be a local mobility anchor point for inter-RAN node handovers and also may provide an anchor for inter-3GPP mobility. Other responsibilities may include lawful intercept, charging, and some policy enforcement.

The SGSN 2328 may track a location of the UE 2302 and perform security functions and access control. In addition, the SGSN 2328 may perform inter-EPC node signaling for mobility between different RAT networks: PDN and S-GW selection as specified by MME 2324; MME selection for handovers: etc. The S3 reference point between the MME 2324 and the SGSN 2328 may enable user and bearer information exchange for inter-3GPP access network mobility in idle/active states.

The HSS 2330 may include a database for network users, including subscription-related information to support the network entities handling of communication sessions. The HSS 2330 can provide support for routing/roaming, authentication, authorization, naming/addressing resolution, location dependencies, etc. An S6a reference point between the HSS 2330) and the MME 2324 may enable transfer of subscription and authentication data for authenticating/authorizing user access to the LTE CN 2320.

The PGW 2332 may terminate an SGi interface toward a data network (DN) 2336 that may include an application/content server 2338. The PGW 2332 may route data packets between the LTE CN 2322 and the data network 2336. The PGW 2332 may be coupled with the SGW 2326 by an S5 reference point to facilitate user plane tunneling and tunnel management. The PGW 2332 may further include a node for policy enforcement and charging data collection (for example, PCEF). Additionally, the SGi reference point between the PGW 2332 and the data network 2336 may be an operator external public, a private PDN, or an intra-operator packet data network, for example, for provision of IMS services. The PGW 2332 may be coupled with a PCRF 2334 via a Gx reference point.

The PCRF 2334 is the policy and charging control element of the LTE CN 2322. The PCRF 2334 may be communicatively coupled to the app/content server 2338 to determine appropriate QoS and charging parameters for service flows. The PCRF 2332 may provision associated rules into a PCEF (via Gx reference point) with appropriate TFT and QCI.

In some embodiments, the CN 2320 may be a 5GC 2340. The 5GC 2340 may include an AUSF 2342, AMF 2344, SMF 2346, UPF 2348, NSSF 2350, NEF 2352, NRF 2354, PCF 2356, UDM 2358, and AF 2360 coupled with one another over interfaces (or "reference points") as shown. Functions of the elements of the 5GC 2340 may be briefly introduced as follows.

The AUSF 2342 may store data for authentication of UE 2302 and handle authentication-related functionality. The AUSF 2342 may facilitate a common authentication framework for various access types. In addition to communicating with other elements of the 5GC 2340 over reference points as shown, the AUSF 2342 may exhibit an Nausf service-based interface.

The AMF 2344 may allow other functions of the 5GC 2340 to communicate with the UE 2302 and the RAN 2304 and to subscribe to notifications about mobility events with respect to the UE 2302. The AMF 2344 may be responsible for registration management (for example, for registering UE 2302), connection management, reachability management, mobility management, lawful interception of AMF-related events, and access authentication and authorization. The AMF 2344 may provide transport for SM messages between the UE 2302 and the SMF 2346, and act as a transparent proxy for routing SM messages. AMF 2344 may also provide transport for SMS messages between UE 2302 and an SMSF. AMF 2344 may interact with the AUSF 2342 and the UE 2302 to perform various security anchor and context management functions. Furthermore. AMF 2344 may be a termination point of a RAN CP interface, which may include or be an N2 reference point between the RAN 2304 and the AMF 2344; and the AMF 2344 may be a termination point of NAS (N1) signaling, and perform NAS ciphering and integrity protection. AMF 2344 may also support NAS signaling with the UE 2302 over an N3 IWF interface.

The SMF 2346 may be responsible for SM (for example, session establishment, tunnel management between UPF 2348 and AN 2308); UE IP address allocation and management (including optional authorization); selection and control of UP function; configuring traffic steering at UPF 2348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 2344 over N2 to AN 2308; and determining SSC mode of a session. SM may refer to management of a PDU session, and a PDU session or "session" may refer to a PDU connectivity service that provides or enables the exchange of PDUs between the UE 2302 and the data network 2336.

The UPF 2348 may act as an anchor point for intra-RAT and inter-RAT mobility, an external PDU session point of interconnect to data network 2336, and a branching point to support multi-homed PDU session. The UPF 2348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 2348 may include an uplink classifier to support routing traffic flows to a data network.

The NSSF 2350 may select a set of network slice instances serving the UE 2302. The NSSF 2350 may also determine allowed NSSAI and the mapping to the subscribed S-NSSAIs, if needed. The NSSF 2350 may also determine the AMF set to be used to serve the UE 2302, or a list of candidate AMFs based on a suitable configuration and possibly by querying the NRF 2354. The selection of a set of network slice instances for the UE 2302 may be triggered by the AMF 2344 with which the UE 2302 is registered by interacting with the NSSF 2350, which may lead to a change of AMF. The NSSF 2350 may interact with the AMF 2344 via an N22 reference point; and may communicate with another NSSF in a visited network via an N31 reference point (not shown). Additionally, the NSSF 2350 may exhibit an Nnssf service-based interface.

The NEF 2352 may securely expose services and capabilities provided by 3GPP network functions for third party, internal exposure/re-exposure. AFs (e.g., AF 2360), edge computing or fog computing systems, etc. In such embodiments, the NEF 2352 may authenticate, authorize, or throttle the AFs. NEF 2352 may also translate information exchanged with the AF 2360 and information exchanged with internal network functions. For example, the NEF 2352 may translate between an AF-Service-Identifier and an internal 5GC information. NEF 2352 may also receive information from other NFs based on exposed capabilities of other NFs. This information may be stored at the NEF 2352 as structured data, or at a data storage NF using standardized interfaces. The stored information can then be re-exposed by the NEF 2352 to other NFs and AFs, or used for other purposes such as analytics. Additionally, the NEF 2352 may exhibit an Nnef service-based interface.

The NRF 2354 may support service discovery functions, receive NF discovery requests from NF instances, and provide the information of the discovered NF instances to the NF instances. NRF 2354 also maintains information of available NF instances and their supported services. As used herein, the terms "instantiate." "instantiation." and the like may refer to the creation of an instance, and an "instance" may refer to a concrete occurrence of an object, which may occur, for example, during execution of program code. Additionally, the NRF 2354 may exhibit the Nnrf service-based interface.

The PCF 2356 may provide policy rules to control plane functions to enforce them, and may also support unified policy framework to govern network behavior. The PCF 2356 may also implement a front end to access subscription information relevant for policy decisions in a UDR of the UDM 2358. In addition to communicating with functions over reference points as shown, the PCF 2356 exhibit an Npcf service-based interface.

The UDM 2358 may handle subscription-related information to support the network entities' handling of communication sessions, and may store subscription data of UE 2302. For example, subscription data may be communicated via an N8 reference point between the UDM 2358 and the AMF 2344. The UDM 2358 may include two parts, an application front end and a UDR. The UDR may store subscription data and policy data for the UDM 2358 and the PCF 2356, and/or structured data for exposure and application data (including PFDs for application detection, application request information for multiple UEs 2302) for the NEF 2352. The Nudr service-based interface may be exhibited by the UDR 221 to allow the UDM 2358. PCF 2356, and NEF 2352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 2358 may exhibit the Nudm service-based interface.

The AF 2360 may provide application influence on traffic routing, provide access to NEF, and interact with the policy framework for policy control.

In some embodiments, the 5GC 2340 may enable edge computing by selecting operator/3rd party services to be geographically close to a point that the UE 2302 is attached to the network. This may reduce latency and load on the network. To provide edge-computing implementations, the 5GC 2340 may select a UPF 2348 close to the UE 2302 and execute traffic steering from the UPF 2348 to data network 2336 via the N6 interface. This may be based on the UE subscription data. UE location, and information provided by the AF 2360. In this way, the AF 2360 may influence UPF (re)selection and traffic routing. Based on operator deployment, when AF 2360 is considered to be a trusted entity, the network operator may permit AF 2360 to interact directly with relevant NFs. Additionally, the AF 2360 may exhibit an Naf service-based interface.

The data network 2336 may represent various network operator services, Internet access, or third party services that may be provided by one or more servers including, for example, application/content server 2338.

Figure 24:
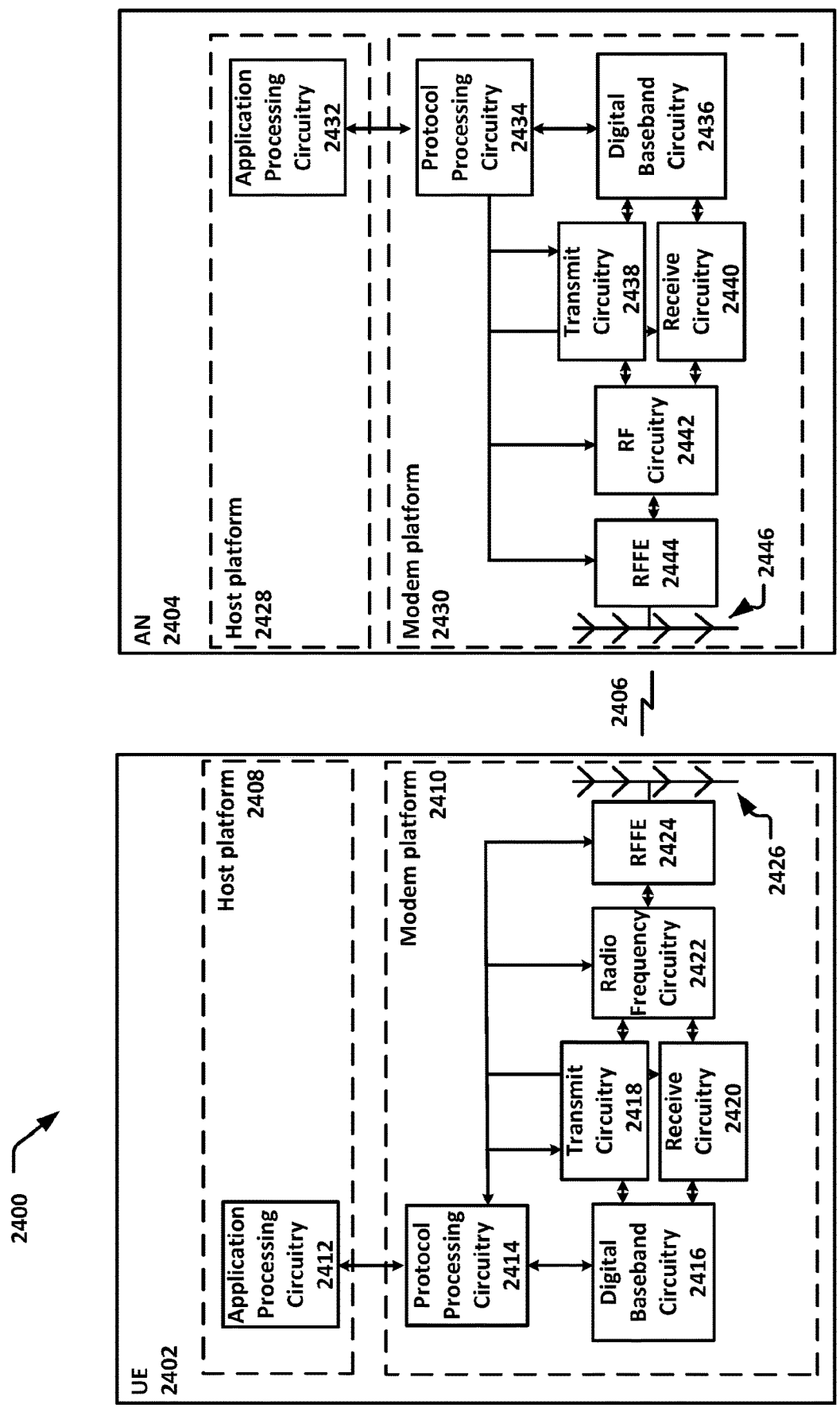
FIG. 24 schematically illustrates components of a wireless network in accordance with various embodiments.

FIG. 24 schematically illustrates a wireless network 2400 in accordance with various embodiments. The wireless network 2400 may include a UE 2402 in wireless communication with an AN 2404. The UE 2402 and AN 2404 may be similar to, and substantially interchangeable with, like-named components described elsewhere herein.

The UE 2402 may be communicatively coupled with the AN 2404 via connection 2406. The connection 2406 is illustrated as an air interface to enable communicative coupling, and can be consistent with cellular communications protocols such as an LTE protocol or a 5G NR protocol operating at mmWave or sub-6 GHZ frequencies.

The UE 2402 may include a host platform 2408 coupled with a modem platform 2410. The host platform 2408 may include application processing circuitry 2412, which may be coupled with protocol processing circuitry 2414 of the modem platform 2410. The application processing circuitry 2412 may run various applications for the UE 2402 that source/sink application data. The application processing circuitry 2412 may further implement one or more layer operations to transmit/receive application data to/from a data network. These layer operations may include transport (for example UDP) and Internet (for example, IP) operations The protocol processing circuitry 2414 may implement one or more of layer operations to facilitate transmission or reception of data over the connection 2406. The layer operations implemented by the protocol processing circuitry 2414 may include, for example, MAC, RLC, PDCP. RRC and NAS operations.

The modem platform 2410 may further include digital baseband circuitry 2416 that may implement one or more layer operations that are "below" layer operations performed by the protocol processing circuitry 2414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 2410 may further include transmit circuitry 2418, receive circuitry 2420, RF circuitry 2422, and RF front end (RFFE) 2424, which may include or connect to one or more antenna panels 2426. Briefly, the transmit circuitry 2418 may include a digital-to-analog converter, mixer, intermediate frequency (IF) components, etc.; the receive circuitry 2420 may include an analog-to-digital converter, mixer, IF components, etc.; the RF circuitry 2422 may include a low-noise amplifier, a power amplifier, power tracking components, etc.; RFFE 2424 may include filters (for example, surface/bulk acoustic wave filters), switches, antenna tuners, beamforming components (for example, phase-array antenna components), etc. The selection and arrangement of the components of the transmit circuitry 2418, receive circuitry 2420, RF circuitry 2422, RFFE 2424, and antenna panels 2426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 2414 may include one or more instances of control circuitry (not shown) to provide control functions for the transmit/receive components.

A UE reception may be established by and via the antenna panels 2426, RFFE 2424, RF circuitry 2422, receive circuitry 2420, digital baseband circuitry 2416, and protocol processing circuitry 2414. In some embodiments, the antenna panels 2426 may receive a transmission from the AN 2404 by receive-beamforming signals received by a plurality of antennas/antenna elements of the one or more antenna panels 2426.

A UE transmission may be established by and via the protocol processing circuitry 2414, digital baseband circuitry 2416, transmit circuitry 2418, RF circuitry 2422, RFFE 2424, and antenna panels 2426. In some embodiments, the transmit components of the UE 2404 may apply a spatial filter to the data to be transmitted to form a transmit beam emitted by the antenna elements of the antenna panels 2426.

Similar to the UE 2402, the AN 2404 may include a host platform 2428 coupled with a modem platform 2430. The host platform 2428 may include application processing circuitry 2432 coupled with protocol processing circuitry 2434 of the modem platform 2430. The modem platform may further include digital baseband circuitry 2436, transmit circuitry 2438, receive circuitry 2440, RF circuitry 2442, RFFE circuitry 2444, and antenna panels 2446. The components of the AN 2404 may be similar to and substantially interchangeable with like-named components of the UE 2402. In addition to performing data transmission/reception as described above, the components of the AN 2408 may perform various logical functions that include, for example, RNC functions such as radio bearer management, uplink and downlink dynamic radio resource management, and data packet scheduling.

Figure 25:
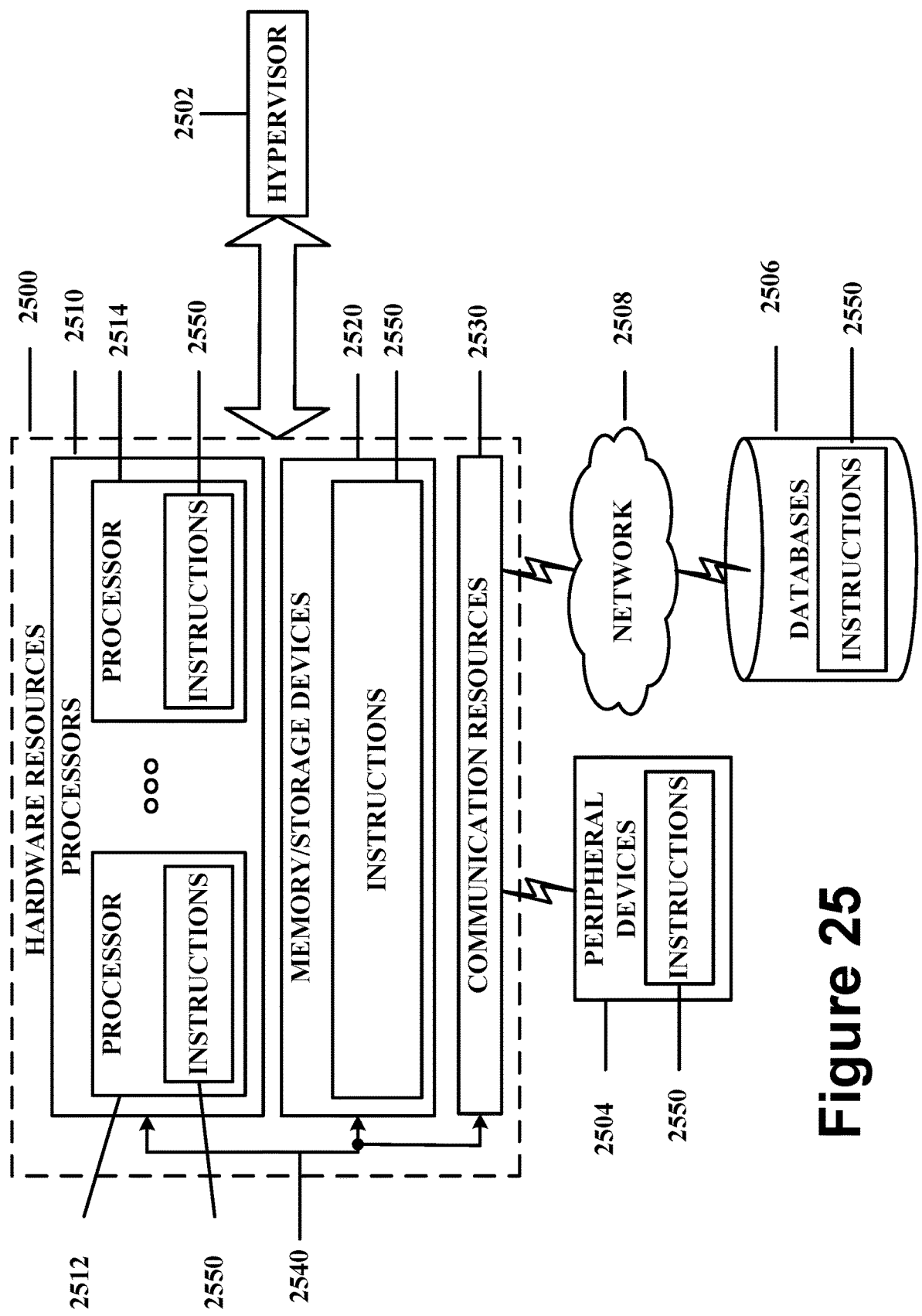
FIG. 25 is a block diagram illustrating components, according to some example embodiments, able to read instructions from a machine-readable or computer-readable medium (e.g., a non-transitory machine-readable storage medium) and perform any one or more of the methodologies discussed herein.

FIG. 25 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 25 shows a diagrammatic representation of hardware resources 2500 including one or more processors (or processor cores) 2510, one or more memory/storage devices 2520, and one or more communication resources 2530, each of which may be communicatively coupled via a bus 2540 or other interface circuitry. For embodiments where node virtualization (e.g., NFV) is utilized, a hypervisor 2502 may be executed to provide an execution environment for one or more network slices/sub-slices to utilize the hardware resources 2500.

The processors 2510 may include, for example, a processor 2512 and a processor 2514. The processors 2510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2520 may include main memory, disk storage, or any suitable combination thereof. The memory/storage devices 2520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2530 may include interconnection or network interface controllers, components, or other suitable devices to communicate with one or more peripheral devices 2504 or one or more databases 2506 or other network elements via a network 2508. For example, the communication resources 2530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 2550 may comprise software, a program, an application, an applet, an app, or other executable code for causing at least any of the processors 2510 to perform any one or more of the methodologies discussed herein. The instructions 2550 may reside, completely or partially, within at least one of the processors 2510 (e.g., within the processor's cache memory), the memory/storage devices 2520, or any suitable combination thereof. Furthermore, any portion of the instructions 2550 may be transferred to the hardware resources 2500 from any combination of the peripheral devices 2504 or the databases 2506. Accordingly, the memory of processors 2510, the memory/storage devices 2520, the peripheral devices 2504, and the databases 2506 are examples of computer-readable and machine-readable media.

Figure 26:
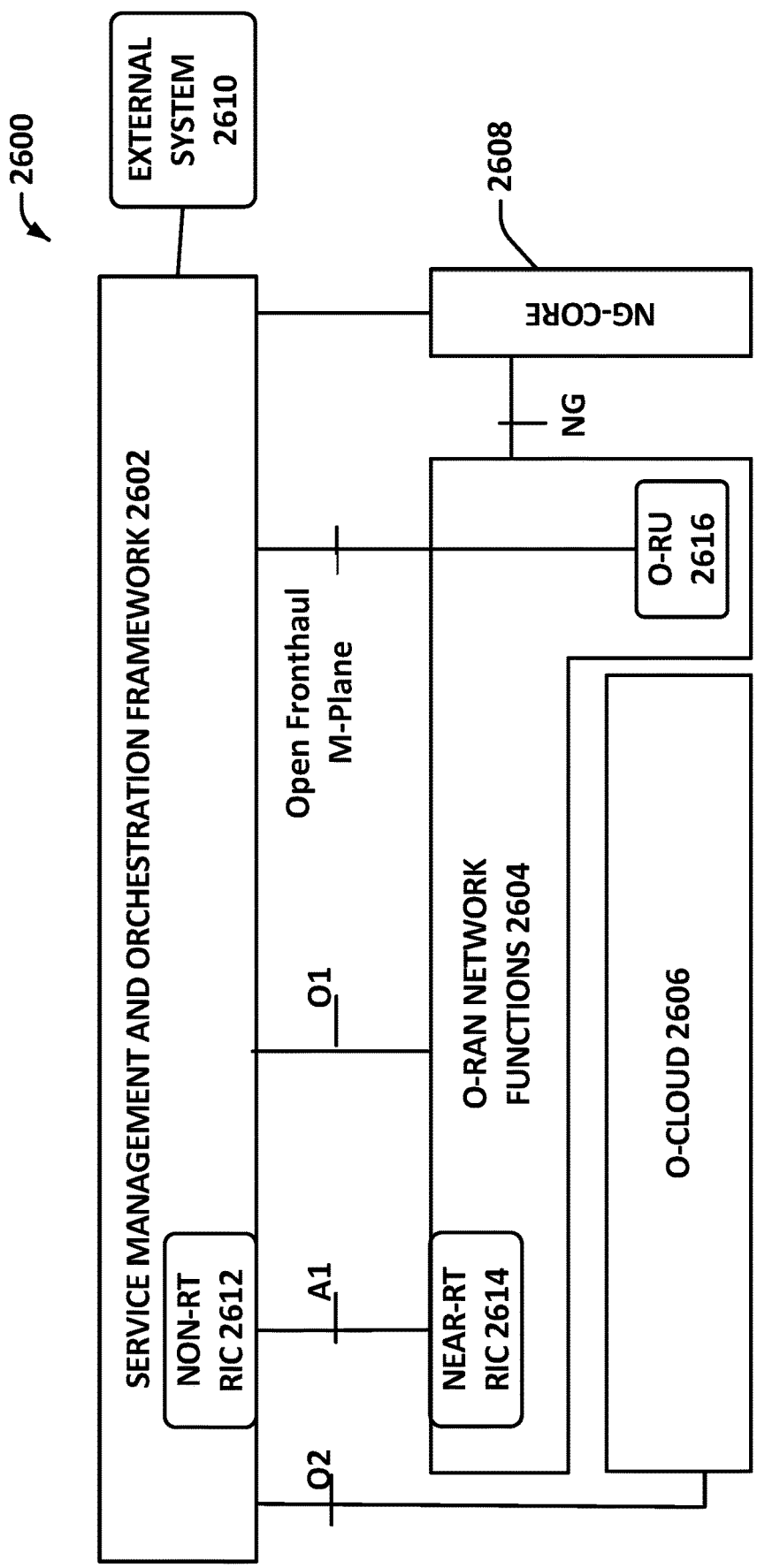
FIG. 26 provides an example of a high-level view of an Open RAN (O-RAN) architecture in accordance with various embodiments.

FIG. 26 provides a high-level view of an Open RAN (O-RAN) architecture 2600. The O-RAN architecture 2600 includes four O-RAN defined interfaces—namely, the A1 interface, the O1 interface, the O2 interface, and the Open Fronthaul Management (M)-plane interface—which connect the Service Management and Orchestration (SMO) framework 2602 to O-RAN network functions (NFs) 2604 and the O-Cloud 2606. The SMO 2602 also connects with an external system 2610, which provides data to the SMO 2602. FIG. 26 also illustrates that the A1 interface terminates at an O-RAN Non-Real Time (RT) RAN Intelligent Controller (RIC) 2612 in or at the SMO 2602 and at the O-RAN Near-RT RIC 2614 in or at the O-RAN NFs 2604. The O-RAN NFS 2604 can be VNFs such as VMs or containers, sitting above the O-Cloud 2606 and/or Physical Network Functions (PNFs) utilizing customized hardware. All O-RAN NFs 2604 are expected to support the O1 interface when interfacing the SMO framework 2602. The O-RAN NFs 2604 connect to the NG-Core 2608 via the NG interface (which is a 3GPP defined interface). The Open Fronthaul M-plane interface between the SMO 2602 and the O-RAN Radio Unit (O-RU) 2616 supports the O-RU 2616 management in the O-RAN hybrid model. The Open Fronthaul M-plane 20) interface is an optional interface to the SMO 2602 that is included for backward compatibility purposes, and is intended for management of the O-RU 2616 in hybrid mode only. The management architecture of flat mode and its relation to the O1 interface for the O-RU 2616 is for future study. The O-RU 2616 termination of the O1 interface towards the SMO 2602.

Figure 27:
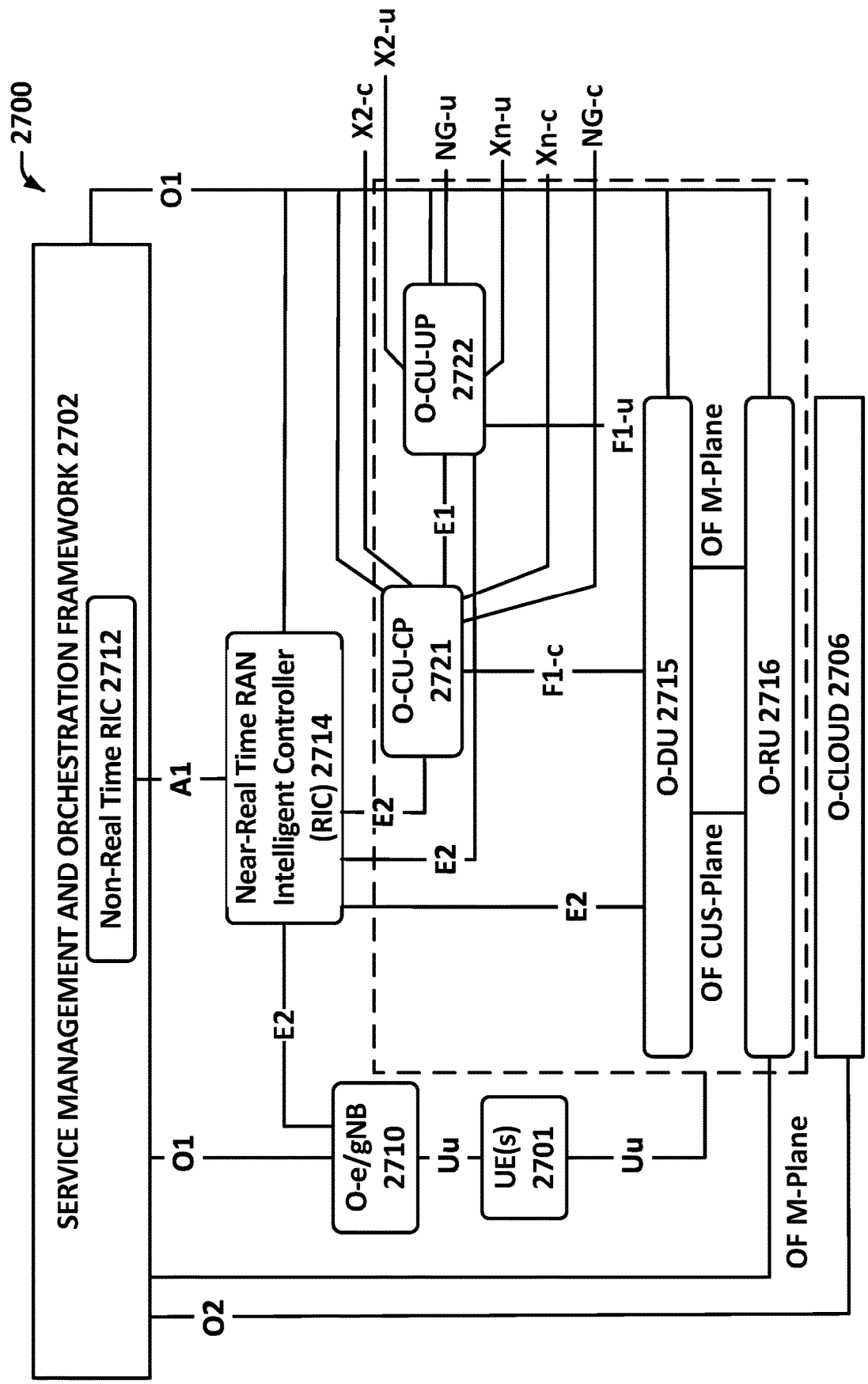
FIG. 27 illustrates an example of a Uu interface in accordance with various embodiments.

FIG. 27 shows an O-RAN logical architecture 2700 corresponding to the O-RAN architecture 2600 of FIG. 26. In FIG. 27, the SMO 2702 corresponds to the SMO 2602. O-Cloud 2706 corresponds to the O-Cloud 2606, the non-RT RIC 2712 corresponds to the non-RT RIC 2612, the near-RT RIC 2714 corresponds to the near-RT RIC 2614, and the O-RU 2716 corresponds to the O-RU 2616 of FIG. 27, respectively. The O-RAN logical architecture 2700 includes a radio portion and a management portion.

The management portion/side of the architectures 2700 includes the SMO Framework 2702 containing the non-RT RIC 2712, and may include the O-Cloud 2706. The O-Cloud 2706 is a cloud computing platform including a collection of physical infrastructure nodes to host the relevant O-RAN functions (e.g., the near-RT RIC 2714. O-CU-CP 2721. O-CU-UP 2722, and the O-DU 2715), supporting software components (e.g., OSs. VMMs, container runtime engines, ML engines, etc.), and appropriate management and orchestration functions.

The radio portion/side of the logical architecture 2700 includes the near-RT RIC 2714, the O-RAN Distributed Unit (O-DU) 2715, the O-RU 2716, the O-RAN Central Unit-Control Plane (O-CU-CP) 2721, and the O-RAN Central Unit-User Plane (O-CU-UP) 2722 functions. The radio portion/side of the logical architecture 2700 may also include the O-e/gNB 2710.

The O-DU 2715 is a logical node hosting RLC. MAC, and higher PHY layer entities/elements (High-PHY layers) based on a lower layer functional split. The O-RU 2716 is a logical node hosting lower PHY layer entities/elements (Low-PHY layer) (e.g., FFT/iFFT. PRACH extraction, etc.) and RF processing elements based on a lower layer functional split. Virtualization of O-RU 2716 is FFS. The O-CU-CP 2721 is a logical node hosting the RRC and the control plane (CP) part of the PDCP protocol. The O O-CU-UP 2722 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 2721. O-CU-UP 2722, O-DU 2715, or any combination of elements. For E-UTRA access the E2 nodes include the O-e/gNB 2710. As shown in FIG. 27, the E2 interface also connects the O-e/gNB 2710 to the Near-RT RIC 2714. The protocols over E2 interface are based exclusively on Control Plane (CP) protocols. The E2 functions are grouped into the following categories: (a) near-RT RIC 2714 services (REPORT. INSERT. CONTROL and POLICY); and (b) near-RT RIC 2714 support functions, which include E2 Interface Management (E2 Setup. E2 Reset. Reporting of General Error Situations, etc.) and Near-RT RIC Service Update (e.g., capability exchange related to the list of E2 Node functions exposed over E2).

FIG. 27 shows the Uu interface between a UE 2701 and O-e/gNB 2710 as well as between the UE 2701 and O-RAN components. The Uu interface is a 3GPP defined interface, which includes a complete protocol stack from L1 to L3 and terminates in the NG-RAN or E-UTRAN. The O-e/gNB 2710 is an LTE eNB, a 5G gNB or ng-eNB that supports the E2 interface. The O-e/gNB 2710 may be the same or similar as AN 2308 and/or AN 2404 discussed previously. The UE 2701 may correspond to UE 2302 and/or UE 2402 discussed with respect to FIGS. 23 and 24, and/or the like. There may be multiple UEs 2701 and/or multiple O-e/gNB 2710, each of which may be connected to one another the via respective Uu interfaces. Although not shown in FIG. 27, the O-e/gNB 2710 supports O-DU 2715 and O-RU 2716 functions with an Open Fronthaul interface between them.

The Open Fronthaul (OF) interface(s) is/are between O-DU 2715 and O-RU 2716 functions. The OF interface(s) includes the Control User Synchronization (CUS) Plane and Management (M) Plane. FIGS. 26 and 27 also show that the O-RU 2716 terminates the OF M-Plane interface towards the O-DU 2715 and optionally towards the SMO 2702. The O-RU 2716 terminates the OF CUS-Plane interface towards the O-DU 2715 and the SMO 2702.

The F1-c interface connects the O-CU-CP 2721 with the O-DU 2715. As defined by 3GPP, the F1-c interface is between the gNB-CU-CP and gNB-DU nodes. However, for purposes of O-RAN, the F1-c interface is adopted between the O-CU-CP 2721 with the O-DU 2715 functions while reusing the principles and protocol stack defined by 3GPP and the definition of interoperability profile specifications.

The F1-u interface connects the O-CU-UP 2722 with the O-DU 2715. As defined by 3GPP, the F1-u interface is between the gNB-CU-UP and gNB-DU nodes. However, for purposes of O-RAN, the F1-u interface is adopted between the O-CU-UP 2722 with the O-DU 2715 functions while reusing the principles and protocol stack defined by 3GPP and the definition of interoperability profile specifications.

The NG-c interface is defined by 3GPP as an interface between the gNB-CU-CP and the AMF in the 5GC. The NG-c is also referred as the N2 interface. The NG-u interface is defined by 3GPP, as an interface between the gNB-CU-UP and the UPF in the 5GC. The NG-u interface is referred as the N3 interface. In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC. In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB. In O-RAN, Xn-c and Xn-u protocol stacks defined by 3GPP are reused and may be adapted for O-RAN purposes The E1 interface is defined by 3GPP as being an interface between the gNB-CU-CP and gNB-CU-UP. In O-RAN, E1 protocol stacks defined by 3GPP are reused and adapted as being an interface between the O-CU-CP 2721 and the O-CU-UP 2722 functions.

The O-RAN Non-Real Time (RT) RAN Intelligent Controller (RIC) 2712 is a logical function within the SMO framework 2602, 2702 that enables non-real-time control and optimization of RAN elements and resources: AI/machine learning (ML) workflow(s) including model training, inferences, and updates: and policy-based guidance of applications/features in the Near-RT RIC 2714.

The O-RAN near-RT RIC 2714 is a logical function that enables near-real-time control and optimization of RAN elements and resources via fine-grained data collection and actions over the E2 interface. The near-RT RIC 2714 may include one or more AI/ML workflows including model training, inferences, and updates.

The non-RT RIC 2712 can be an ML training host to host the training of one or more ML models. ML training can be performed offline using data collected from the RIC. O-DU 2715 and O-RU 2716. For supervised learning, non-RT RIC 2712 is part of the SMO 2702, and the ML training host and/or ML model host/actor can be part of the non-RT RIC 2712 and/or the near-RT RIC 2714. For unsupervised learning, the ML training host and ML model host/actor can be part of the non-RT RIC 2712 and/or the near-RT RIC 2714. For reinforcement learning, the ML training host and ML model host/actor may be co-located as part of the non-RT RIC 2712 and/or the near-RT RIC 2714. In some implementations, the non-RT RIC 2712 may request or trigger ML model training in the training hosts regardless of where the model is deployed and executed. ML models may be trained and not currently deployed.

In some implementations, the non-RT RIC 2712 provides a query-able catalog for an ML designer/developer to publish/install trained ML models (e.g., executable software components). In these implementations, the non-RT RIC 2712 may provide discovery mechanism if a particular ML model can be executed in a target ML inference host (MF), and what number and type of ML models can be executed in the MF. For example, there may be three types of ML catalogs made discoverable by the non-RT RIC 2712: a design-time catalog (e.g., residing outside the non-RT RIC 2712 and hosted by some other ML platform(s)), a training/deployment-time catalog (e.g., residing inside the non-RT RIC 2712), and a run-time catalog (e.g., residing inside the non-RT RIC 2712). The non-RT RIC 2712 supports necessary capabilities for ML model inference in support of ML assisted solutions running in the non-RT RIC 2712 or some other ML inference host. These capabilities enable executable software to be installed such as VMs, containers, etc. The non-RT RIC 2712 may also include and/or operate one or more ML engines, which are packaged software executable libraries that provide methods, routines, data types, etc., used to run ML models. The non-RT RIC 2712 may also implement policies to switch and activate ML model instances under different operating conditions.

The non-RT RIC 272 is be able to access feedback data (e.g., FM and PM statistics) over the O1 interface on ML model performance and perform necessary evaluations. If the ML model fails during runtime, an alarm can be generated as feedback to the non-RT RIC 2712. How well the ML model is performing in terms of prediction accuracy or other operating statistics it produces can also be sent to the non-RT RIC 2712 over O1. The non-RT RIC 2712 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 2714 and/or in the non-RT RIC 2712, which continuously monitors resource utilization. If resources are low or fall below a certain threshold, the runtime environment in the near-RT RIC 2714 and/or the non-RT RIC 2712 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 2712 (within or outside the SMO 2702) and the near-RT RIC 2714. The A1 interface supports three types of services, including a Policy Management Service, an Enrichment Information Service, and ML Model Management Service. A1 policies have the following characteristics compared to persistent configuration: A1 policies are not critical to traffic: A1 policies have temporary validity: A1 policies may handle individual UE or dynamically defined groups of UEs: A1 policies act within and take precedence over the configuration: and A1 policies are non-persistent, e.g., do not survive a restart of the near-RT RIC.

EXAMPLE PROCEDURES

Figure 10:
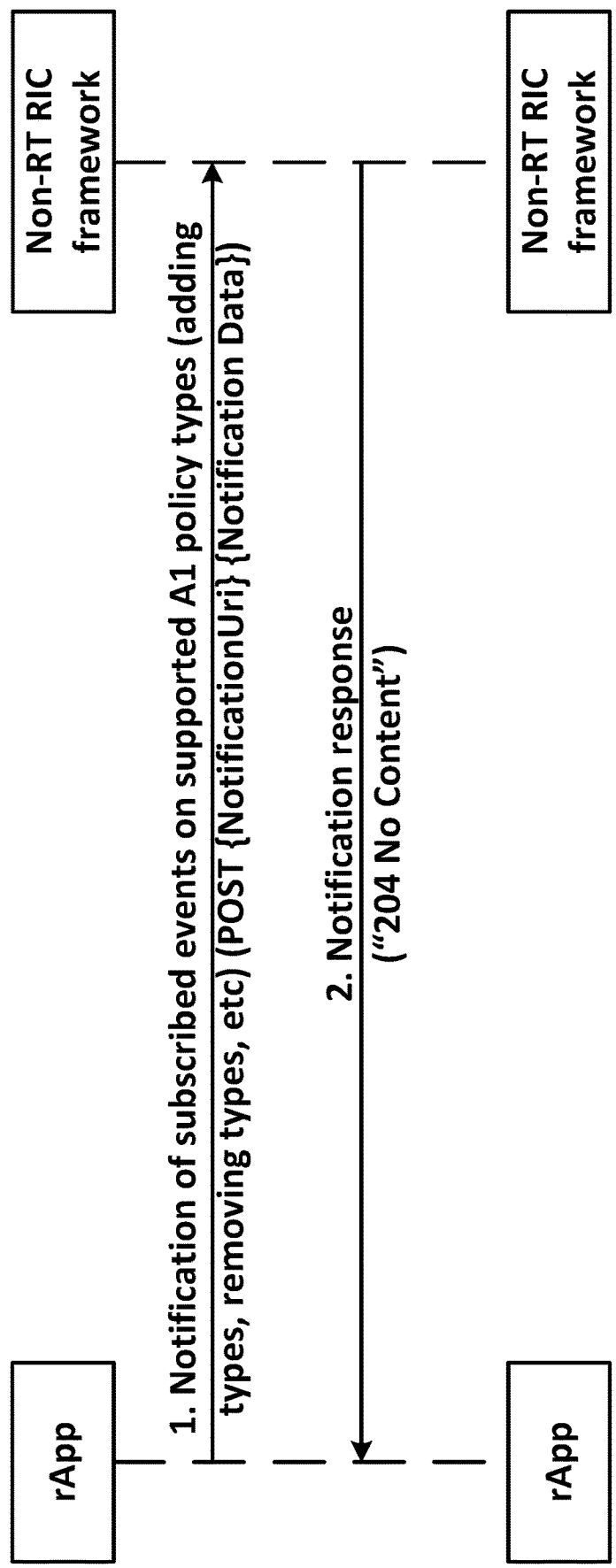
FIG. 10 illustrates an example of an rApp subscription notification on supported A1 policy types (e.g., adding types, remove types) in accordance with various embodiments.
Figure 11:
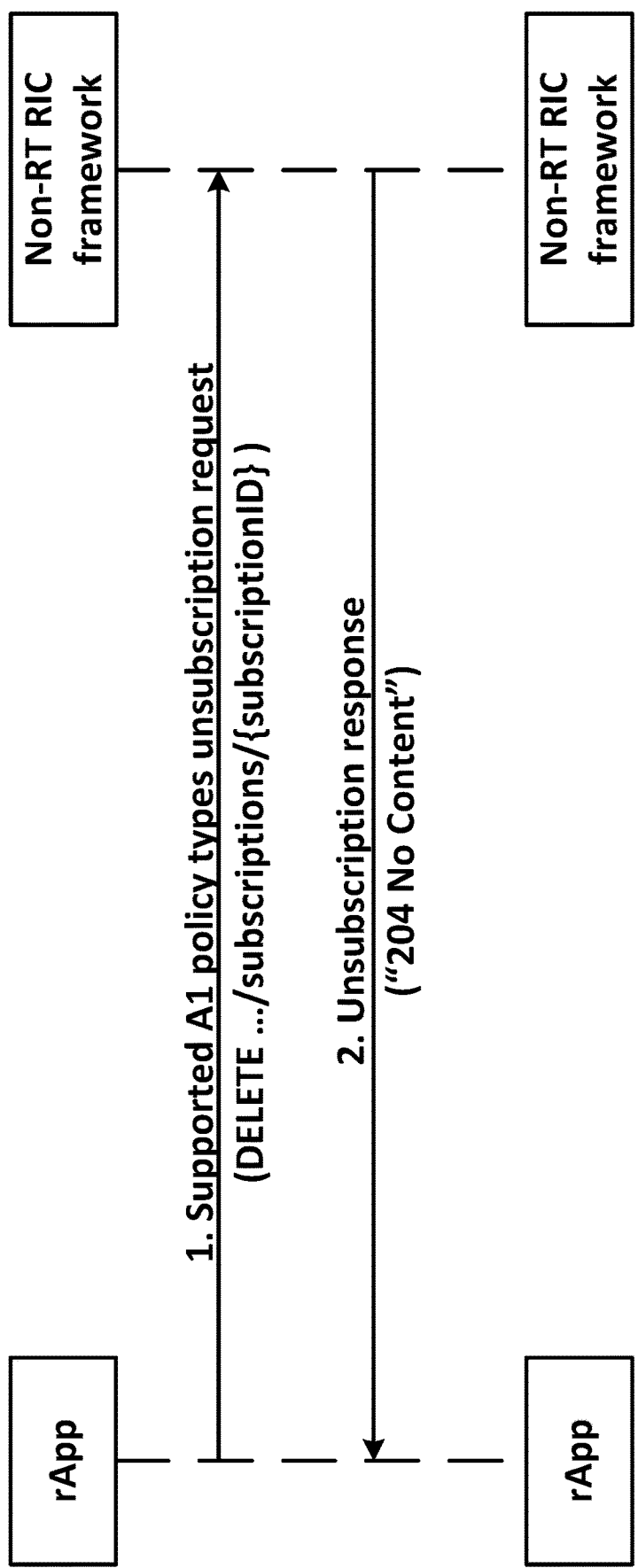
FIG. 11 illustrates an example of an rApp unsubscribing from its subscribed notification in accordance with various embodiments.

In some embodiments, the electronic device(s), network(s), system(s), chip(s) or component(s), or portions or implementations thereof, of FIGS. 10-12, or some other figure herein, may be configured to perform one or more processes, techniques, or methods as described herein, or portions thereof. One such process is depicted in FIG. 28. In this example, process 2800) includes, at 2805, retrieving, from a memory, policy statement information for a plurality of radio access network (RAN) automation applications (rApps), wherein the policy statement information includes respective policy scope identifiers for respective rApps in the plurality of rApps. The process further includes, at 2810, identifying a conflict associated with common or overlapping policy scope identifiers between two or more rApps from the plurality of rApps. The process further includes, at 2815, modifying one or more A1 policies associated with an A1 interface connecting a non-real-time (non-RT) RAN intelligence controller (RIC) and a near-real-time (near-RT) RIC to resolve the conflict. The process further includes, at 2820, notifying the two or more rApps of the modification of the one or more A1 policies.

Another such example is illustrated in FIG. 29. In this example, process 2900 includes, at 2905, identifying a conflict associated with common or overlapping policy scope identifiers between two or more radio access network (RAN) automation applications (rApps) from a plurality of rApps based on policy statement information that includes respective policy scope identifiers for respective rApps in the plurality of rApps. The process further includes, at 2910, modifying one or more A1 policies associated with an A1 interface connecting a non-real-time (non-RT) RAN intelligence controller (RIC) and a near-real-time (near-RT) RIC to resolve the conflict. The process further includes, at 2915, notifying the two or more rApps of the modification of the one or more A1 policies.

Another such example is illustrated in FIG. 30. In this example, process 3000 includes, at 3005, Identifying a conflict associated with common or overlapping policy scope identifiers between two or more radio access network (RAN) automation applications (rApps) from a plurality of rApps based on policy statement information that includes respective policy scope identifiers for respective rApps in the plurality of rApps. The process further includes, at 3010, modifying one or more A1 policies associated with an A1 interface connecting a non-real-time (non-RT) RAN intelligence controller (RIC) and a near-real-time (near-RT) RIC to resolve the conflict. The process further includes, at 3015, notifying the two or more rApps of the modification of the one or more A1 policies. The process further includes, at 3020, tracking a supported A1 policy type for each of a plurality of near-RT RICs, and either: notifying an rApp of a supported A1 policy type for a near-RT RIC based on a policy identifier, or notifying an rApp of a change in supported policy types for a near-RT RIC For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of an A1 policy function to provide one or more of the following functionalities in the Non-RT RIC framework:

It hosts RAN intent repository. A1 policy function stores injected RAN intent.

It hosts A1 policy repository. A1 policy function stores A1 policy created by policy generation rApps. A1 policy function response to rApp's query about A1 policies. A1 policy function notifies rApps about their subscribed events on A1 policies.

It performs conflict mitigation for A1 policies. If A1 policies created by policy generation rApps set contradicting policy statements to the same or overlapping policy scope identifiers, the A1 policy function resolves the conflicts by modifying one or more A1 policies. A1 policy function notifies the change of A1 policies to their generation rApp.

It tracks the enforcement status of all A1 policies created in the Non-RT RIC. A1 policy function notifies rApp when the enforcement status of subscribed A1 policy changes.

It tracks the supported A1 policy types of each connected Near-RT RIC.

Example 2 may include the method of example 1 or some other example herein, wherein A1 policy function provides one or more of the following services to rApps:

RAN intent discovery.

A1 policy management

Supported A1 policy management discovery

Example 3 may include rApp can query RAN intent available in the Non-RT RIC framework.

Example 4 may include rApp can subscribe, unsubscribe RAN intent from A1 policy function. A1 policy function notifies rApp of its subscribed events on RAN intent, e.g., New RAN intent available;

RAN intent is modified: and/or

RAN intent is deleted, etc.

Example 5 may include rApp can generate A1 policy based on RAN intent and send it to the A1 policy function (via POST method). A1 policy function assigns an identifier for generated A1 policy in the response. The identifier is not the same of the A1 policy ID used in A1 specification Example 6 rApp can modify A1 policy based on RAN intent and network performance observation (O1 data). rApp send the updated A1 policy to the A1 policy function (e.g., via PUT method).

Example 7 may include rApp can delete A1 policy (e.g., via DELETE method).

Example 8 may include rApp can query A1 policy (e.g., via GET method) by providing filtering on the scope identifier (e.g., UE id, Cell id, etc.). A1 policy function returns a list of A1 policy ID, which satisfies the filtering in the query request.

Example 9 may include rApp can subscribe (e.g., via POST method), unsubscribe (e.g., via DELETE method) notifications about A1 policy from A1 policy function. A1 policy function notifies rApp of its subscribed events on A1 policies, e.g., New A1 policy is created;

A1 policy is modified;

A1 policy is deleted; and/or

The enforcement status of A1 policy is changed, etc.

Example 10 may include rApp can query supported A1 policy (e.g., via GET method) by providing filtering on the scope identifier (e.g., UE id, Cell id, Near-RT RIC id, etc.). A1 policy function returns a list of supported A1 policy type ID.

Example 11 may include rApp can subscribe (e.g., via POST method), unsubscribe (e.g., via DELETE method) notifications about supported A1 policy types from A1 policy function. A1 policy function notifies rApp of its subscribed events on supported A1 policy types, e.g., New supported A1 policy types are added Some of supported A1 policy types are removed, etc.

Example 12 may include A1 policy related procedures are proposed for RAN intent subscription, rApp querying supported A1 policy types, A1 policy generation, rApp subscribing policy enforcement status feedback, A1 policy update, A1 deletion.

Example X1 includes an apparatus comprising:

memory to store policy statement information for a plurality of radio access network (RAN) automation applications (rApps); and processing circuitry, coupled with the memory, to:

retrieve the policy statement information from the memory, wherein the policy statement information includes respective policy scope identifiers for respective rApps in the plurality of rApps;

identify a conflict associated with common or overlapping policy scope identifiers between two or more rApps from the plurality of rApps;

modify one or more A1 policies associated with an A1 interface connecting a non-real-time (non-RT) RAN intelligence controller (RIC) and a near-real-time (near-RT) RIC to resolve the conflict; and notify the two or more rApps of the modification of the one or more A1 policies.

Example X2 includes the apparatus of example X1 or some other example herein, wherein the processing circuitry is further to:

track an enforcement status of an A1 policy created in the non-RT RIC; and notify an rApp subscribed to the tracked A1 policy when the enforcement status of the tracked A1 policy changes.

Example X3 includes the apparatus of example X1 or some other example herein, wherein the processing circuitry is further to track a supported A1 policy type for each of a plurality of near-RT RICs.

Example X4 includes the apparatus of example X3 or some other example herein, wherein the processing circuitry is to notify an rApp of a supported A1 policy type for a near-RT RIC based on a policy identifier.

Example X5 includes the apparatus of example X3 or some other example herein, wherein the processing circuitry is to notify an rApp of a change in supported policy types for a near-RT RIC.

Example X6 includes the apparatus of example X1 or some other example herein, wherein the processing circuitry is further to generate an A1-related service that includes: a RAN intent discovery service, an A1 policy management service, or an A1 policy type discovery service.

Example X7 includes the apparatus of example X1 or some other example herein, wherein the processing circuitry is further to:
receive a supported A1 policy types query request via an R1 termination; and
in response to the supported A1 policy types query request, send a query response that includes an indication of supported A1 policy types to a policy generation rApp via the R1 termination.

Example X8 includes the apparatus of example X1 or some other example herein, wherein the processing circuitry is further to:
receive an A1 policy feedback message from the near-RT RIC via an A1 termination to indicate a change of A1 policy enforcement status; and
send a notification of the A1 policy enforcement status change to a policy generation rApp via an R1 termination.

Example X9 includes the apparatus of example X1 or some other example herein, wherein the processing circuitry is further to:
receive an A1 policy modification request from a policy generation rApp via an R1 termination;
update an A1 policy over the A1 interface based on the A1 policy modification request; and
send an A1 policy modification response to the policy generation rApp via the R1 termination.

Example X10 includes the apparatus of example X1 or some other example herein, wherein the processing circuitry is further to:
receive an A1 policy deletion request from a policy generation rApp via an R1 termination;
remove an A1 policy over the A1 interface based on the A1 policy deletion request; and
send an A1 policy deletion response to the policy generation rApp via the R1 termination.

Example X11 includes the apparatus of any of examples X1-X10 or some other example herein, wherein the processing circuitry is to implement an A1 policy function.

Example X12 includes one or more computer-readable media storing instructions that, when executed by one or more processors, cause an A1 policy function to:
identify a conflict associated with common or overlapping policy scope identifiers between two or more radio access network (RAN) automation applications (rApps) from a plurality of rApps based on policy statement information that includes respective policy scope identifiers for respective rApps in the plurality of rApps;
modify one or more A1 policies associated with an A1 interface connecting a non-real-time (non-RT) RAN intelligence controller (RIC) and a near-real-time (near-RT) RIC to resolve the conflict; and
notify the two or more rApps of the modification of the one or more A1 policies.

Example X13 includes the one or more computer-readable media of example X12 or some other example herein, wherein the media further stores instructions to:
track an enforcement status of an A1 policy created in the non-RT RIC; and
notify an rApp subscribed to the tracked A1 policy when the enforcement status of the tracked A1 policy changes.

Example X14 includes the one or more computer-readable media of example X12 or some other example herein, wherein the media further stores instructions to: track a supported A1 policy type for each of a plurality of near-RT RICs Example X15 includes the one or more computer-readable media of example X14 or some other example herein, wherein the media further stores instructions to:
notify an rApp of a supported A1 policy type for a near-RT RIC based on a policy identifier; or
notify an rApp of a change in supported policy types for a near-RT RIC.

Example X16 includes the one or more computer-readable media of example X12 or some other example herein, wherein the media further stores instructions to:
receive a supported A1 policy types query request via an R1 termination; and
in response to the supported A1 policy types query request, send a query response that includes an indication of supported A1 policy types to a policy generation rApp via the R1 termination.

Example X17 includes the one or more computer-readable media of example X12 or some other example herein, wherein the media further stores instructions to:
receive an A1 policy feedback message from the near-RT RIC via an A1 termination to indicate a change of A1 policy enforcement status; and
send a notification of the A1 policy enforcement status change to a policy generation rApp via an R1 termination.

Example X18 includes the one or more computer-readable media of example X12 or some other example herein, wherein the media further stores instructions to:
receive an A1 policy modification request from a policy generation rApp via an R1 termination;
update an A1 policy over the A1 interface based on the A1 policy modification request; and
send an A1 policy modification response to the policy generation rApp via the R1 termination.

Example X19 includes the one or more computer-readable media of example X12 or some other example herein, wherein the media further stores instructions to:
receive an A1 policy deletion request from a policy generation rApp via an R1 termination;
remove an A1 policy over the A1 interface based on the A1 policy deletion request; and
send an A1 policy deletion response to the policy generation rApp via the R1 termination.

Example X20 includes the one or more computer-readable media of any of Examples X12-X19 or some other example herein, wherein the media further stores instructions to generate an A1-related service that includes: a RAN intent discovery service, an A1 policy management service, or an A1 policy type discovery service.

Example X21 includes one or more computer-readable media storing instructions that, when executed by one or more processors, cause an A1 policy function to:
- identify a conflict associated with common or overlapping policy scope identifiers between two or more radio access network (RAN) automation applications (rApps) from a plurality of rApps based on policy statement information that includes respective policy scope identifiers for respective rApps in the plurality of rApps;
- modify one or more A1 policies associated with an A1 interface connecting a non-real-time (non-RT) RAN intelligence controller (RIC) and a near-real-time (near-RT) RIC to resolve the conflict;
- notify the two or more rApps of the modification of the one or more A1 policies; and
- track a supported A1 policy type for each of a plurality of near-RT RICs, and either: notify an rApp of a supported A1 policy type for a near-RT RIC based on a policy identifier, or notify an rApp of a change in supported policy types for a near-RT RIC.

Example X22 includes the one or more computer-readable media of example X21 or some other example herein, wherein the media further stores instructions to send, to an rApp via an R1 termination, one or more of:
- an indication of a change in an enforcement status of a tracked A1 policy;
- an indication of supported A1 policy types; and
- a notification of an A1 policy enforcement status change.

Example X23 includes the one or more computer-readable media of example X21 or some other example herein, wherein the media further stores instructions to send, to:
- update an A1 policy over the A1 interface based on an A1 policy modification request; or
- remove an A1 policy over the A1 interface based on an A1 policy deletion request.

Example X24 includes the one or more computer-readable media of any of examples X21-X23 or some other example herein, wherein the media further stores instructions to generate an A1-related service that includes: a RAN intent discovery service, an A1 policy management service, or an A1 policy type discovery service.

Example Z01 may include an apparatus comprising means to perform one or more elements of a method described in or related to any of examples 1-X24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X24, or any other method or process described herein.

Example Z03 may include an apparatus comprising logic, modules, or circuitry to perform one or more elements of a method described in or related to any of examples 1-X24, or any other method or process described herein.

Example Z04 may include a method, technique, or process as described in or related to any of examples 1-X24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X24, or portions thereof.

Example Z06 may include a signal as described in or related to any of examples 1-X24, or portions or parts thereof.

Example Z07 may include a datagram, packet, frame, segment, protocol data unit (PDU), or message as described in or related to any of examples 1-X24, or portions or parts thereof, or otherwise described in the present disclosure.

Example Z08 may include a signal encoded with data as described in or related to any of examples 1-X24, or portions or parts thereof, or otherwise described in the present disclosure.

Example Z09 may include a signal encoded with a datagram, packet, frame, segment, protocol data unit (PDU), or message as described in or related to any of examples 1-X24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X24, or portions thereof.

Example Z11 may include a computer program comprising instructions, wherein execution of the program by a processing element is to cause the processing element to carry out the method, techniques, or process as described in or related to any of examples 1-X24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |

| | |
|---|---|
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |

| | | | | |
|---|---|---|---|---|
| FEC | Forward Error Correction | | ISDN | Integrated Services Digital Network |
| FFS | For Further Study | | ISIM | IM Services Identity Module |
| FFT | Fast Fourier Transformation | | ISO | International Organisation for Standardisation |
| feLAA | further enhanced Licensed Assisted Access, further enhanced LAA | | ISP | Internet Service Provider |
| | | | IWF | Interworking-Function |
| FN | Frame Number | | I-WLAN | Interworking WLAN Constraint length of the convolutional code, USIM Individual key |
| FPGA | Field-Programmable Gate Array | | | |
| FR | Frequency Range | | kB | Kilobyte (1000 bytes) |
| FQDN | Fully Qualified Domain Name | | kbps | kilo-bits per second |
| G-RNTI | GERAN Radio Network Temporary Identity | | Kc | Ciphering key |
| GERAN | GSM EDGE RAN, GSM EDGE Radio Access Network | | Ki | Individual subscriber authentication key |
| | | | KPI | Key Performance Indicator |
| GGSN | Gateway GPRS Support Node | | KQI | Key Quality Indicator |
| GLONASS | GLObal'naya NAvigatsionnaya Sputnikovaya Sistema (Engl.: Global Navigation Satellite System) | | KSI | Key Set Identifier |
| | | | ksps | kilo-symbols per second |
| gNB | Next Generation NodeB | | KVM | Kernel Virtual Machine |
| gNB-CU | gNB-centralized unit, Next Generation NodeB centralized unit | | L1 | Layer 1 (physical layer) |
| | | | L1-RSRP | Layer 1 reference signal received power |
| gNB-DU | gNB-distributed unit, Next Generation NodeB distributed unit | | L2 | Layer 2 (data link layer) |
| | | | L3 | Layer 3 (network layer) |
| GNSS | Global Navigation Satellite System | | LAA | Licensed Assisted Access |
| GPRS | General Packet Radio Service | | LAN | Local Area Network |
| GPSI | Generic Public Subscription Identifier | | LADN | Local Area Data Network |
| GSM | Global System for Mobile Communications, Groupe Spécial Mobile | | LBT | Listen Before Talk |
| | | | LCM | LifeCycle Management |
| GTP | GPRS Tunneling Protocol | | LCR | Low Chip Rate |
| GTP-U | GPRS Tunnelling Protocol for User Plane | | LCS | Location Services |
| GTS | Go To Sleep Signal (related to WUS) | | LCID | Logical Channel ID |
| GUMMEI | Globally Unique MME Identifier | | LI | Layer Indicator |
| GUTI | Globally Unique Temporary UE Identity | | LLC | Logical Link Control, Low Layer Compatibility |
| HARQ | Hybrid ARQ, Hybrid Automatic Repeat Request | | LMF | Location Management Function |
| HANDO | Handover | | LOS | Line of Sight |
| HFN | HyperFrame Number | | LPLMN | Local PLMN |
| HHO | Hard Handover | | LPP | LTE Positioning Protocol |
| HLR | Home Location Register | | LSB | Least Significant Bit |
| HN | Home Network | | LTE | Long Term Evolution |
| HO | Handover | | LWA | LTE-WLAN aggregation |
| HPLMN | Home Public Land Mobile Network | | LWIP | LTE/WLAN Radio Level Integration with IPsec Tunnel |
| HSDPA | High Speed Downlink Packet Access | | | |
| HSN | Hopping Sequence Number | | LTE | Long Term Evolution |
| HSPA | High Speed Packet Access | | M2M | Machine-to-Machine |
| HSS | Home Subscriber Server | | MAC | Medium Access Control (protocol layering context) |
| HSUPA | High Speed Uplink Packet Access | | MAC | Message authentication code (security/encryption context) |
| HTTP | Hyper Text Transfer Protocol | | | |
| HTTPS | Hyper Text Transfer Protocol Secure (https is http/1.1 over SSL, i.e. port 443) | | MAC-A | MAC used for authentication and key agreement (TSG T WG3 context) |
| I-Block | Information Block | | MAC-I | MAC used for data integrity of signalling messages (TSG T WG3 context) |
| ICCID | Integrated Circuit Card Identification | | | |
| IAB | Integrated Access and Backhaul | | MANO | Management and Orchestration |
| ICIC | Inter-Cell Interference Coordination | | MBMS | Multimedia Broadcast and Multicast Service |
| ID | Identity, identifier | | MBSFN | Multimedia Broadcast multicast service Single Frequency Network |
| IDFT | Inverse Discrete Fourier Transform | | | |
| IE | Information element | | MCC | Mobile Country Code |
| IBE | In-Band Emission | | MCG | Master Cell Group |
| IEEE | Institute of Electrical and Electronics Engineers | | MCOT | Maximum Channel Occupancy Time |
| IEI | Information Element Identifier | | MCS | Modulation and coding scheme |
| IEIDL | Information Element Identifier Data Length | | MDAF | Management Data Analytics Function |
| IETF | Internet Engineering Task Force | | MDAS | Management Data Analytics Service |
| IF | Infrastructure | | MDT | Minimization of Drive Tests |
| IIOT | Industrial Internet of Things | | ME | Mobile Equipment |
| IM | Interference Measurement, Intermodulation, IP Multimedia | | MeNB | master eNB |
| | | | MER | Message Error Ratio |
| IMC | IMS Credentials | | MGL | Measurement Gap Length |
| IMEI | International Mobile Equipment Identity | | MGRP | Measurement Gap Repetition Period |
| IMGI | International mobile group identity | | MIB | Master Information Block, Management Information Base |
| IMPI | IP Multimedia Private Identity | | | |
| IMPU | IP Multimedia PUblic identity | | MIMO | Multiple Input Multiple Output |
| IMS | IP Multimedia Subsystem | | MLC | Mobile Location Centre |
| IMSI | International Mobile Subscriber Identity | | MM | Mobility Management |
| IoT | Internet of Things | | MME | Mobility Management Entity |
| IP | Internet Protocol | | MN | Master Node |
| Ipsec | IP Security, Internet Protocol Security | | MNO | Mobile Network Operator |
| IP-CAN | IP-Connectivity Access Network | | MO | Measurement Object, Mobile Originated |
| IP-M | IP Multicast | | MPBCH | MTC Physical Broadcast CHannel |
| IPv4 | Internet Protocol Version 4 | | MPDCCH | MTC Physical Downlink Control CHannel |
| IPv6 | Internet Protocol Version 6 | | MPDSCH | MTC Physical Downlink Shared CHannel |
| IR | Infrared | | MPRACH | MTC Physical Random Access CHannel |
| IS | In Sync | | MPUSCH | MTC Physical Uplink Shared Channel |
| IRP | Integration Reference Point | | MPLS | MultiProtocol Label Switching |

| | |
|---|---|
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |

| | |
|---|---|
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |

| | |
|---|---|
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry." as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/ or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance." "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation: otherwise, the term "Special Cell" refers to the Pcell.

The term "application" may refer to a complete and deployable package, environment to achieve a certain function in an operational environment. The term "AI/ML application" or the like may be an application that contains some AI/ML models and application-level descriptions.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data." "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model." "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), descision tree algorithms, support machine vectors. Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s): the data used to train an ML model and the data used to determine inferences may overlap, however, "training data" and "inference data" refer to different concepts.

What is claimed is:

1. An apparatus comprising:
    memory to store policy statement information for a plurality of radio access network (RAN) automation applications (rApps); and
    processor circuitry, coupled with the memory, to:
        retrieve the policy statement information from the memory, wherein the policy statement information includes respective policy scope identifiers for respective rApps in the plurality of rApps;
        identify a conflict associated with common or overlapping policy scope identifiers between two or more rApps from the plurality of rApps;
        modify one or more A1 policies associated with an A1 interface connecting a non-real-time (non-RT) RAN intelligence controller (RIC) and a near-real-time (near-RT) RIC to resolve the conflict; and
        notify the two or more rApps of the modification of the one or more A1 policies.

2. The apparatus of claim 1, wherein the processor circuitry is further to:
track an enforcement status of an A1 policy created in the non-RT RIC; and
notify an rApp subscribed to the tracked A1 policy when the enforcement status of the tracked A1 policy changes.

3. The apparatus of claim 1, wherein the processor circuitry is further to track a supported A1 policy type for each of a plurality of near-RT RICs.

4. The apparatus of claim 3, wherein the processor circuitry is to notify an rApp of a supported A1 policy type for a near-RT RIC based on a policy identifier.

5. The apparatus of claim 3, wherein the processor circuitry is to notify an rApp of a change in supported policy types for a near-RT RIC.

6. The apparatus of claim 1, wherein the processor circuitry is further to generate an A1-related service that includes: a RAN intent discovery service, an A1 policy management service, or an A1 policy type discovery service.

7. The apparatus of claim 1, wherein the processor circuitry is further to:
receive a supported A1 policy types query request via an R1 termination; and
in response to the supported A1 policy types query request, send a query response that includes an indication of supported A1 policy types to a policy generation rApp via the R1 termination.

8. The apparatus of claim 1, wherein the processor circuitry is further to:
receive an A1 policy feedback message from the near-RT RIC via an A1 termination to indicate a change of A1 policy enforcement status; and
send a notification of the A1 policy enforcement status change to a policy generation rApp via an R1 termination.

9. The apparatus of claim 1, wherein the processor circuitry is further to:
receive an A1 policy modification request from a policy generation rApp via an R1 termination;
update an A1 policy over the A1 interface based on the A1 policy modification request; and
send an A1 policy modification response to the policy generation rApp via the R1 termination.

10. The apparatus of claim 1, wherein the processor circuitry is further to:
receive an A1 policy deletion request from a policy generation rApp via an R1 termination;
remove an A1 policy over the A1 interface based on the A1 policy deletion request; and
send an A1 policy deletion response to the policy generation rApp via the R1 termination.

11. One or more non-transitory computer-readable media storing instructions that, when executed by one or more processors, cause an A1 policy function to:
identify a conflict associated with common or overlapping policy scope identifiers between two or more radio access network (RAN) automation applications (rApps) from a plurality of rApps based on policy statement information that includes respective policy scope identifiers for respective rApps in the plurality of rApps;
modify one or more A1 policies associated with an A1 interface connecting a non-real-time (non-RT) RAN intelligence controller (RIC) and a near-real-time (near-RT) RIC to resolve the conflict; and
notify the two or more rApps of the modification of the one or more A1 policies.

12. The one or more non-transitory computer-readable media of claim 11, wherein the media further stores instructions to:
track an enforcement status of an A1 policy created in the non-RT RIC; and
notify an rApp subscribed to the tracked A1 policy when the enforcement status of the tracked A1 policy changes.

13. The one or more non-transitory computer-readable media of claim 11, wherein the media further stores instructions to:
track a supported A1 policy type for each of a plurality of near-RT RICs; and
notify an rApp of a supported A1 policy type for a near-RT RIC based on a policy identifier; or
notify an rApp of a change in supported policy types for a near-RT RIC.

14. The one or more non-transitory computer-readable media of claim 11, wherein the media further stores instructions to:
receive a supported A1 policy types query request via an R1 termination; and
in response to the supported A1 policy types query request, send a query response that includes an indication of supported A1 policy types to a policy generation rApp via the R1 termination.

15. The one or more non-transitory computer-readable media of claim 11, wherein the media further stores instructions to:
receive an A1 policy feedback message from the near-RT RIC via an A1 termination to indicate a change of A1 policy enforcement status; and
send a notification of the A1 policy enforcement status change to a policy generation rApp via an R1 termination.

16. The one or more non-transitory computer-readable media of claim 11, wherein the media further stores instructions to:
receive an A1 policy modification request from a policy generation rApp via an R1 termination;
update an A1 policy over the A1 interface based on the A1 policy modification request; and
send an A1 policy modification response to the policy generation rApp via the R1 termination.

17. The one or more non-transitory computer-readable media of claim 11, wherein the media further stores instructions to generate an A1-related service that includes: a RAN intent discovery service, an A1 policy management service, or an A1 policy type discovery service.

18. One or more non-transitory computer-readable media storing instructions that, when executed by one or more processors, cause an A1 policy function to:
identify a conflict associated with common or overlapping policy scope identifiers between two or more radio access network (RAN) automation applications (rApps) from a plurality of rApps based on policy statement information that includes respective policy scope identifiers for respective rApps in the plurality of rApps;
modify one or more A1 policies associated with an A1 interface connecting a non-real-time (non-RT) RAN intelligence controller (RIC) and a near-real-time (near-RT) RIC to resolve the conflict;
notify the two or more rApps of the modification of the one or more A1 policies; and track a supported A1 policy type for each of a plurality of near-RT RICs, and either: notify an rApp of a supported A1 policy type for a near-RT RIC based on a policy identifier, or notify an rApp of a change in supported policy types for a near-RT RIC.

19. The one or more non-transitory computer-readable media of claim 18, wherein the media further stores instructions to send, to an rApp via an R1 termination, one or more of:
- an indication of a change in an enforcement status of a tracked A1 policy;
- an indication of supported A1 policy types; and
- a notification of an A1 policy enforcement status change.

20. The one or more non-transitory computer-readable media of claim 18, wherein the media further stores instructions to generate an A1-related service that includes: a RAN intent discovery service, an A1 policy management service, or an A1 policy type discovery service.

* * * * *